United States Patent
Takada et al.

(10) Patent No.: US 10,029,474 B2
(45) Date of Patent: Jul. 24, 2018

(54) LIQUID STORAGE UNIT, LIQUID DISCHARGE APPARATUS USING THE SAME, AND METHOD OF REMOVING BUBBLES FROM LIQUID STORAGE UNIT

(71) Applicant: CANON KABUSHIKI KAISHA, Tokyo (JP)

(72) Inventors: Hitoshi Takada, Yokohama (JP); Yasuo Kotaki, Yokohama (JP); Tetsuya Ohashi, Matsudo (JP); Ryoji Inoue, Kawasaki (JP); Takatoshi Kitagawa, Kawasaki (JP); Hironori Murakami, Tokyo (JP); Takeho Miyashita, Yokohama (JP); Hiroki Hayashi, Kawasaki (JP); Hironori Fukuchi, Kawasaki (JP); Norihiro Ikebe, Kawasaki (JP); Takashi Fukushima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/715,234

(22) Filed: May 18, 2015

(65) Prior Publication Data
US 2015/0343793 A1    Dec. 3, 2015

(30) Foreign Application Priority Data

May 30, 2014    (JP) .................................. 2014-112182

(51) Int. Cl.
*B41J 2/175*    (2006.01)
*B41J 2/19*    (2006.01)
*B01D 19/00*    (2006.01)

(52) U.S. Cl.
CPC ............ *B41J 2/19* (2013.01); *B01D 19/0073* (2013.01); *B41J 2/17509* (2013.01); *B41J 2/17513* (2013.01); *B41J 2/17556* (2013.01)

(58) Field of Classification Search
USPC ...................................... 347/85, 86
See application file for complete search history.

(56) References Cited

U.S. PATENT DOCUMENTS

| | | | |
|---|---|---|---|
| 5,646,666 A | 7/1997 | Cowger et al. | 347/87 |
| 5,745,137 A * | 4/1998 | Scheffelin | B41J 2/175 347/50 |

(Continued)

FOREIGN PATENT DOCUMENTS

| | | |
|---|---|---|
| CN | 1410269 | 4/2003 |
| CN | 1535834 | 10/2004 |

(Continued)

OTHER PUBLICATIONS

U.S. Appl. No. 14/744,939, filed Jun. 19, 2015; Inventors: Soji Kondo, Yasuo Kotaki, Kenta Udagawa, Naozumi Nabeshima, Tatsuo Nanjo, Kazuya Yoshii.

(Continued)

*Primary Examiner* — Matthew Luu
*Assistant Examiner* — Lily Kemathe
(74) *Attorney, Agent, or Firm* — Fitzpatrick, Cella, Harper & Scinto

(57) ABSTRACT

A liquid storage unit including a first liquid storage chamber having a constant volume and being capable of holding liquid supplied from a liquid tank; a second liquid storage chamber communicating with the first liquid storage chamber; a pressure control chamber configured to change a pressure of the pressure control chamber through actuation of a pressure control unit; and an elastic member being configured to tightly partition the second liquid storage (Continued)

chamber and the pressure control chamber from each other and being deformable so as to increase and decrease a volume of the second liquid storage chamber in accordance with the pressure of the pressure control chamber. The elastic member is capable of removing bubbles in the first liquid storage chamber by increasing and decreasing the volume of the second liquid storage chamber through the deformation.

21 Claims, 16 Drawing Sheets

(56) References Cited

U.S. PATENT DOCUMENTS

| | | | |
|---|---|---|---|
| 5,880,748 A * | 3/1999 | Childers | B41J 2/175 347/6 |
| 6,116,722 A | 9/2000 | Sato et al. | 347/85 |
| 6,382,783 B1 | 5/2002 | Hayashi et al. | 347/85 |
| 6,422,674 B1 | 7/2002 | Hinami et al. | 347/7 |
| 6,443,567 B1 | 9/2002 | Hayashi et al. | 347/85 |
| 6,450,631 B1 | 9/2002 | Hayashi et al. | 347/86 |
| 6,471,343 B1 * | 10/2002 | Shimizu | B41J 2/17509 347/85 |
| 6,505,923 B1 | 1/2003 | Yamamoto et al. | 347/85 |
| 6,511,167 B1 | 1/2003 | Kitabatake et al. | 347/86 |
| 6,530,654 B2 | 3/2003 | Kitabatake et al. | 347/86 |
| 6,543,886 B1 | 4/2003 | Hattori et al. | 347/85 |
| 6,550,898 B2 | 4/2003 | Hayashi et al. | 347/85 |
| 6,598,963 B1 | 7/2003 | Yamamoto et al. | 347/85 |
| 6,637,872 B2 | 10/2003 | Ara et al. | 347/85 |
| 6,663,233 B2 * | 12/2003 | Otsuka | B41J 2/17506 141/114 |
| 6,712,460 B2 * | 3/2004 | Ohashi | B41J 2/17513 347/86 |
| 6,719,415 B1 | 4/2004 | Hattori et al. | 347/86 |
| 6,758,558 B2 * | 7/2004 | Chiu | B41J 2/17556 347/86 |
| 6,773,099 B2 | 8/2004 | Inoue et al. | 347/86 |
| 6,796,645 B2 | 9/2004 | Hayashi et al. | 347/86 |
| 6,805,434 B2 | 10/2004 | Hayashi et al. | 347/85 |
| 6,830,324 B2 * | 12/2004 | Ogura | B41J 2/17506 347/86 |
| 6,854,836 B2 * | 2/2005 | Ishinaga | B41J 2/17523 347/85 |
| 6,908,180 B2 * | 6/2005 | Dietl | B41J 2/175 347/85 |
| 6,948,803 B2 * | 9/2005 | Yoshida | B41J 2/175 347/85 |
| 6,969,161 B2 * | 11/2005 | Kuwabara | B41J 2/17509 347/85 |
| 7,004,575 B2 | 2/2006 | Inoue et al. | 347/86 |
| 7,104,640 B2 | 9/2006 | Ogura et al. | 347/86 |
| 7,290,861 B2 | 11/2007 | Inoue et al. | 347/49 |
| 7,360,876 B2 | 4/2008 | Inoue et al. | 347/85 |
| 7,497,562 B2 * | 3/2009 | Childs | B41J 2/175 347/85 |
| 7,556,365 B2 * | 7/2009 | Stathem | B41J 2/17513 347/86 |
| 7,607,770 B2 | 10/2009 | Inoue et al. | 347/85 |
| 7,618,135 B2 * | 11/2009 | Stathem | B41J 2/17596 347/86 |
| 7,699,450 B2 * | 4/2010 | Furukawa | B41J 2/17509 347/85 |
| 7,762,654 B2 * | 7/2010 | Kawamura | B41J 2/17513 347/86 |
| 7,841,706 B2 * | 11/2010 | Ishinaga | B41J 2/17556 347/84 |
| 8,147,043 B2 | 4/2012 | Kojima et al. | 347/85 |
| 8,205,974 B2 * | 6/2012 | Ogura | B41J 2/17513 347/86 |
| 8,480,216 B2 * | 7/2013 | Matsumoto | B41J 2/16523 347/85 |
| 8,596,768 B2 | 12/2013 | Koike et al. | 347/85 |
| 8,662,634 B2 * | 3/2014 | Katoh | B41J 2/16532 347/30 |
| 8,770,730 B2 | 7/2014 | Nanjo et al. | 347/86 |
| 8,770,731 B2 | 7/2014 | Miyashita et al. | 347/86 |
| 9,016,842 B2 | 4/2015 | Miyashita et al. | B41J 2/17596 |
| 9,327,513 B2 * | 5/2016 | Moriguchi | B41J 2/175 |
| 9,511,591 B2 | 12/2016 | Kimura et al. | B41J 2/17506 |
| 2003/0007047 A1 | 1/2003 | Otsuka et al. | 347/89 |
| 2004/0090501 A1 | 5/2004 | Yoshida et al. | 347/85 |
| 2004/0196341 A1 * | 10/2004 | Ogura | B41J 2/17513 347/86 |
| 2005/0264626 A1 * | 12/2005 | Childs | B41J 2/175 347/89 |
| 2007/0058009 A1 | 3/2007 | Furukawa et al. | 347/85 |
| 2007/0222829 A1 * | 9/2007 | Stathem | B41J 2/17513 347/85 |
| 2008/0297569 A1 | 12/2008 | Umeda | 347/85 |
| 2009/0290002 A1 * | 11/2009 | Katoh | B41J 2/175 347/85 |
| 2010/0079514 A1 * | 4/2010 | Shibata | B41J 2/175 347/7 |
| 2011/0164077 A1 * | 7/2011 | Masunaga | B41J 2/175 347/6 |
| 2012/0033003 A1 * | 2/2012 | Tanaka | B41J 2/175 347/6 |
| 2012/0320130 A1 * | 12/2012 | Anderson | B41J 2/1433 347/47 |
| 2013/0010037 A1 * | 1/2013 | Yokoyama | B41J 2/175 347/85 |
| 2013/0201263 A1 * | 8/2013 | Stathem | B41J 2/17513 347/86 |

FOREIGN PATENT DOCUMENTS

| | | |
|---|---|---|
| CN | 1950211 | 4/2007 |
| EP | 1199178 | 4/2002 |
| EP | 1661710 | 5/2006 |
| JP | S63-145039 | 6/1988 |
| JP | 2002-370374 | 12/2002 |
| JP | 2007-076016 | 3/2007 |
| JP | 2008-230137 | 10/2008 |
| JP | 2008-290419 | 12/2008 |
| JP | 2012-183695 | 9/2012 |
| JP | 2013-063628 | 4/2013 |
| JP | 2013-111967 | 6/2013 |
| JP | 2014-079909 | 5/2014 |

OTHER PUBLICATIONS

Chinese Office Action dated Jun. 27, 2016, in counterpart Chinese Patent Application No. 201510290479.1, with English language translation.
Extended European Search Report dated Jun. 22, 2016, in counterpart European Patent Application No. EP 15001521.2.
Office Action dated Nov. 14, 2016 in counterpart Russian Application No. 2015118575, with English translation.
Office Action dated Jan. 30, 2018 in counterpart KR Application No. 10-2015-0070960 with translation.
Office Action dated Mar. 6, 2018 in counterpart Japan Application No. 2014-112182, together with English translation thereof.

* cited by examiner

LIQUID STORAGE UNIT, LIQUID DISCHARGE APPARATUS USING THE SAME, AND METHOD OF REMOVING BUBBLES FROM LIQUID STORAGE UNIT

BACKGROUND OF THE INVENTION

Field of the Invention

The present invention relates to a liquid storage unit to be used in a liquid discharge apparatus configured to discharge liquid onto a recording medium, and more particularly, to a mechanism for removing bubbles from a liquid storage unit.

Description of the Related Art

A liquid discharge apparatus including a liquid tank and a liquid storage chamber configured to hold liquid supplied from the liquid tank and supply the liquid to a liquid discharge head is publicly known. Air may enter the liquid storage chamber due to various factors. The air may cause decrease in filling efficiency of the liquid from the liquid tank to the liquid storage chamber, and the entry of air to the liquid discharge head may affect the discharge. In Japanese Patent Application Laid-Open No. 2008-290419 and Japanese Patent Application Laid-Open No. 2002-370374, a liquid discharge apparatus including a liquid storage chamber having a bellows structure and a mechanism for expanding and contracting the liquid storage chamber in its axial direction is disclosed. When this mechanism is actuated, the entire liquid storage chamber is expanded and contracted, thereby being capable of discharging the air stagnating in the liquid storage chamber to the liquid tank.

In the liquid discharge apparatus disclosed in Japanese Patent Application Laid-Open No. 2008-290419 and Japanese Patent Application Laid-Open No. 2002-370374, the entire liquid storage chamber needs to be expanded and contracted, thereby being difficult to increase the thickness of the liquid storage chamber. Also in the bellows structure, it is preferred that the liquid storage chamber be thinner for the purpose of securing sufficient flexibility. On the other hand, the thin liquid storage chamber has high air permeability, and hence air is liable to enter the liquid storage chamber. The air thus having entered is mixed with liquid to become bubbles and stagnate in the liquid storage chamber. As a result, the frequency of the process of discharging the bubbles in the liquid storage chamber toward the liquid tank is increased. When a thick structure is employed for the purpose of reducing the air permeability of the liquid storage chamber, the liquid storage chamber cannot be expanded and contracted satisfactorily, thereby being difficult to discharge the bubbles in the liquid storage chamber to the liquid tank.

SUMMARY OF THE INVENTION

It is an object of the present invention to provide a liquid storage unit capable of discharging bubbles in a liquid storage chamber to a liquid tank, and reducing the frequency of discharging the bubbles in the liquid storage chamber to the liquid tank.

According to an embodiment of the present invention, there is provided a liquid storage unit, including a first liquid storage chamber having a constant volume and being capable of holding liquid supplied from a liquid tank; a second liquid storage chamber communicating with the first liquid storage chamber; a pressure control chamber configured to change a pressure of the pressure control chamber through actuation of a pressure control unit; and an elastic member being configured to tightly partition the second liquid storage chamber and the pressure control chamber from each other and being deformable so as to increase and decrease a volume of the second liquid storage chamber in accordance with the pressure of the pressure control chamber.

The volume of the second liquid storage chamber is increased and decreased through the deformation of the elastic member in accordance with the pressure of the pressure control chamber. Thus, the volume of a combined space of the first liquid storage chamber, which communicates with the second liquid storage chamber and has a constant volume, and the second liquid storage chamber is increased and decreased, with the result that bubbles stagnating in the first liquid storage chamber can be discharged to the liquid tank. The first liquid storage chamber has a constant volume, and hence there is no need to deform the first liquid storage chamber itself. Therefore, when the thickness of the first liquid storage chamber is increased, the air permeability of the first liquid storage chamber can be suppressed. As a result, the bubbles are less liable to be generated in the first liquid storage chamber, thereby being capable of reducing the frequency of the process of discharging the bubbles to the liquid tank.

Further features of the present invention will become apparent from the following description of exemplary embodiments with reference to the attached drawings.

DESCRIPTION OF THE EMBODIMENTS

Now, embodiments of the present invention are described in detail with reference to the drawings. In the following embodiments, a liquid discharge head discharges liquid such as ink while moving relative to a recording medium, to thereby form an image. In the embodiments of the present invention, a liquid tank is removably mounted on the liquid discharge head, and liquid is directly supplied from the liquid tank to the liquid discharge head. The liquid tank together with the liquid discharge head is mounted on a carriage configured to conduct reciprocating motion (main). The present invention is also applicable to such a liquid discharge head and a liquid discharge apparatus that the liquid tank is not mounted on the liquid discharge head and the liquid tank and the liquid discharge head are connected to each other through a tube. In another embodiment of the present invention, a fixed liquid discharge head may discharge liquid onto a moving recording medium, to thereby form an image.

Figure 1:
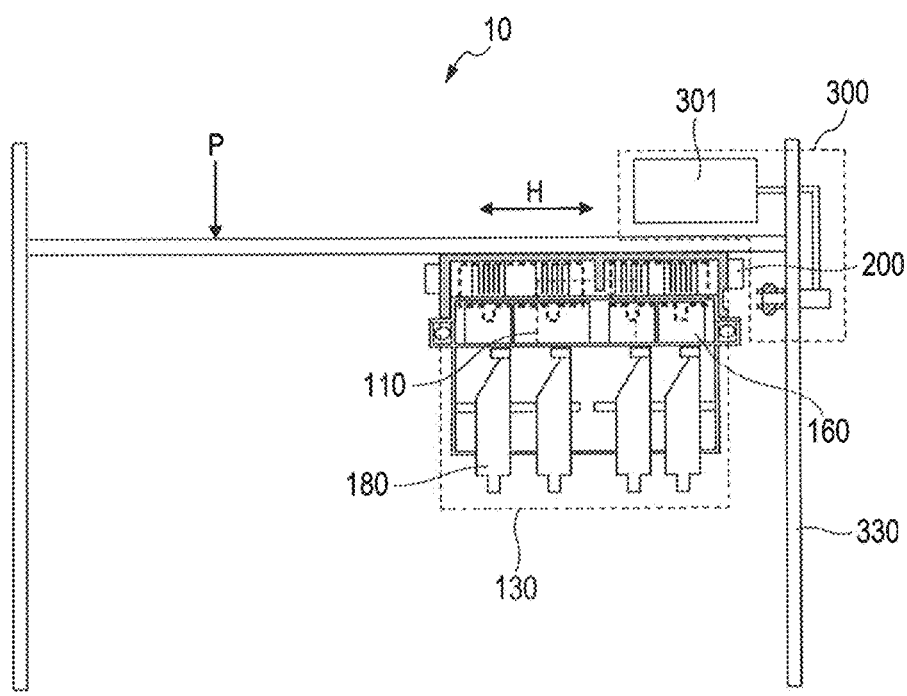
FIG. 1 is a schematic top view of a liquid discharge apparatus and liquid storage units.
Figure 2:
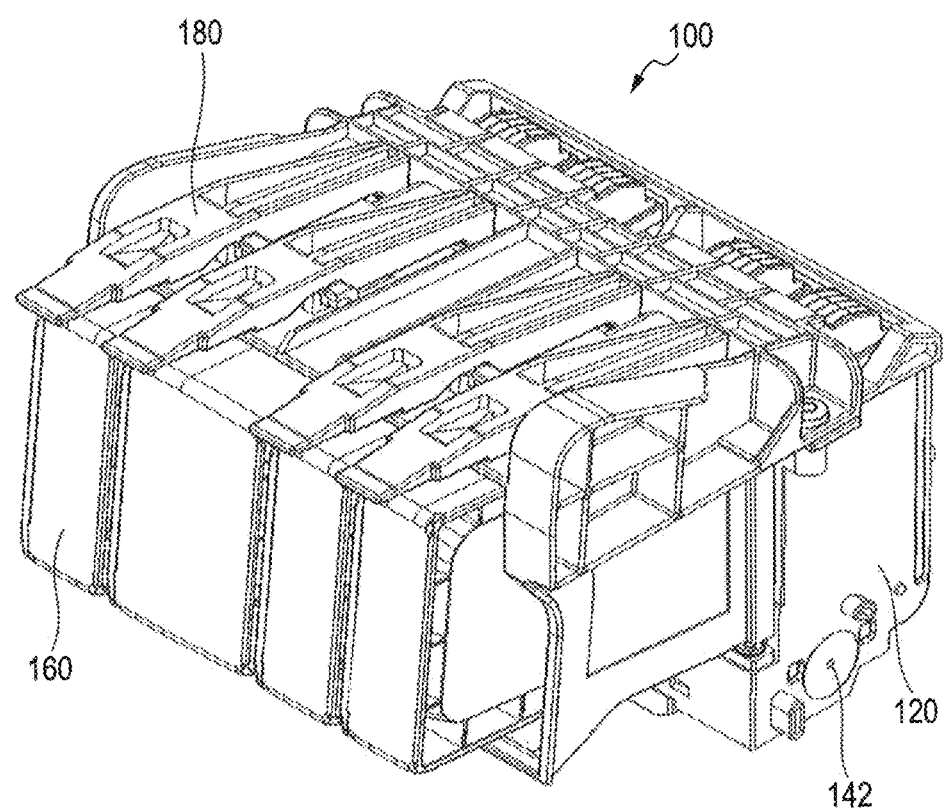
FIG. 2 is an overall perspective view of the liquid storage units illustrated in FIG. 1.
Figure 3:
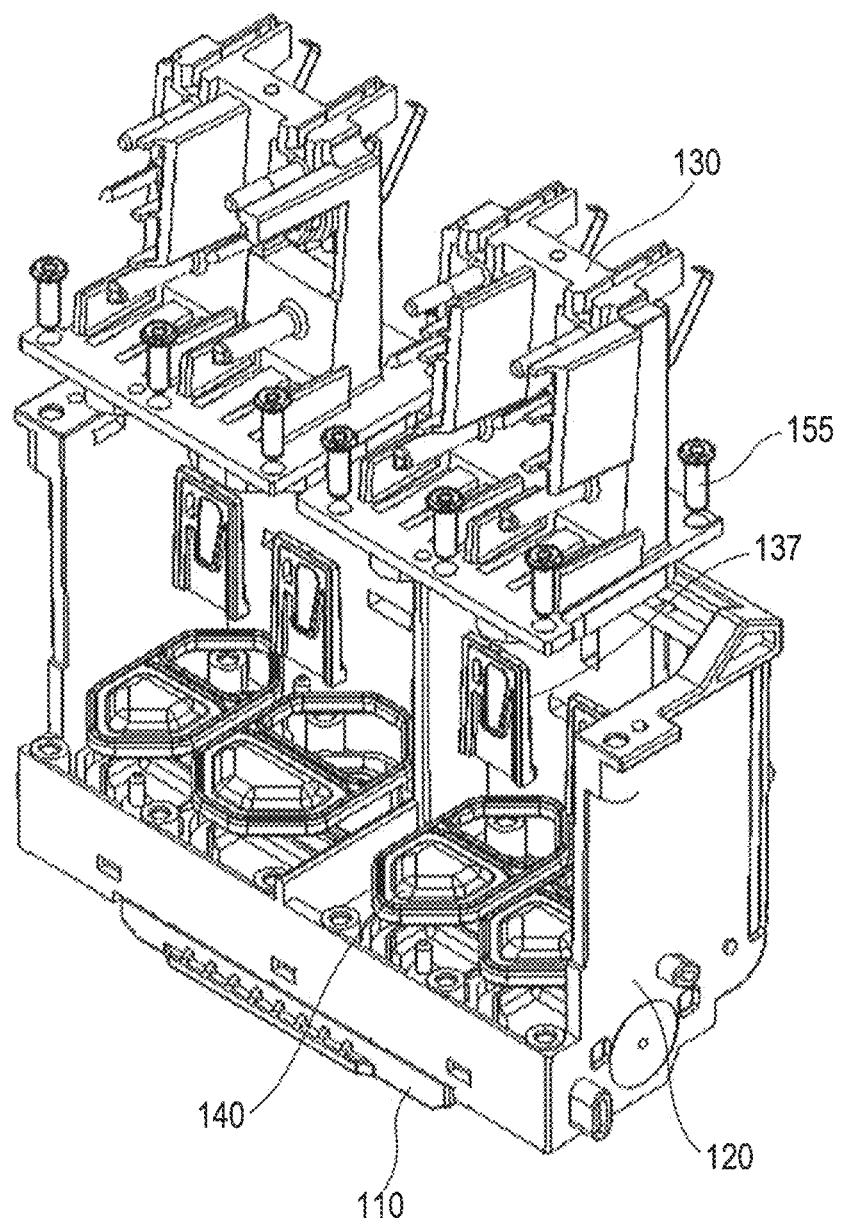
FIG. 3 is an exploded perspective view of the liquid storage units illustrated in FIG. 1.
Figure 4:
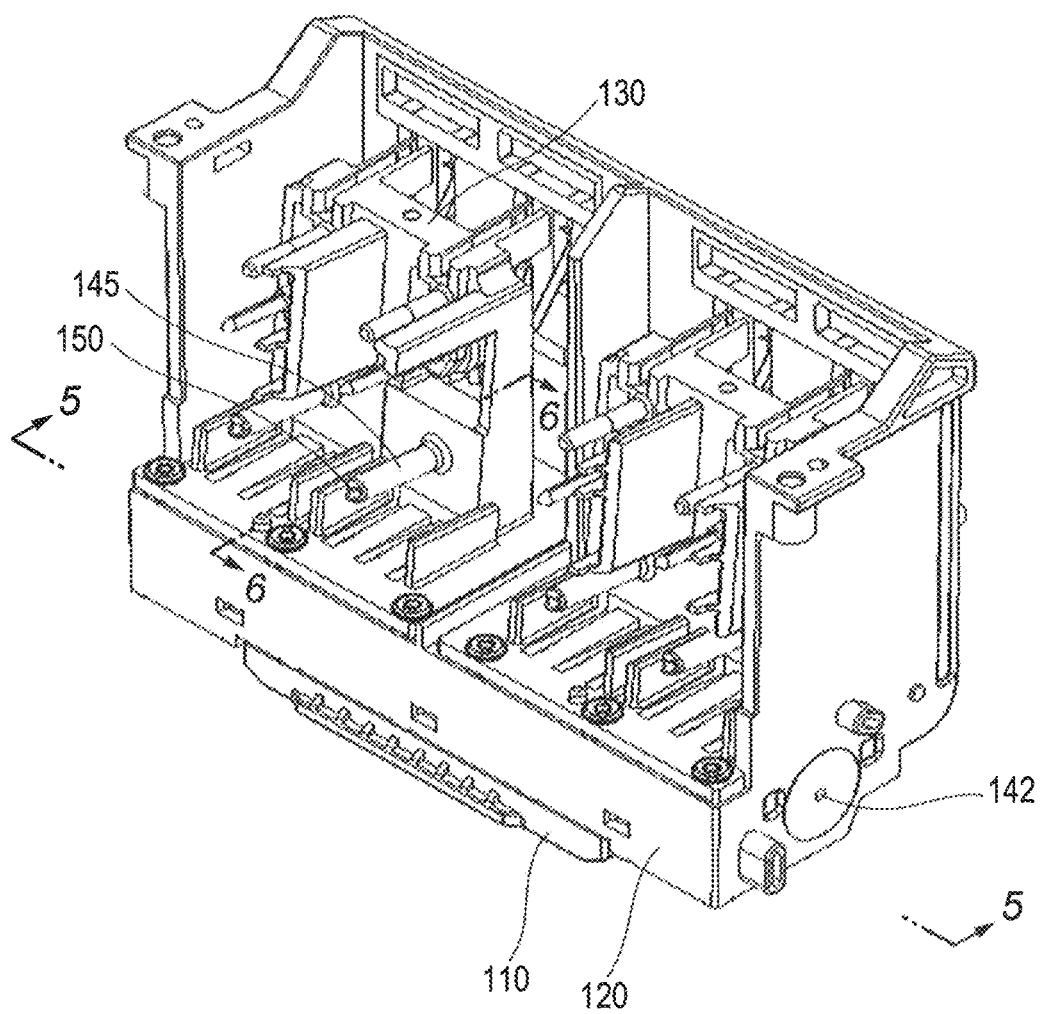
FIG. 4 is an exploded perspective view of the liquid storage units on which liquid tanks are not mounted.
Figure 5:
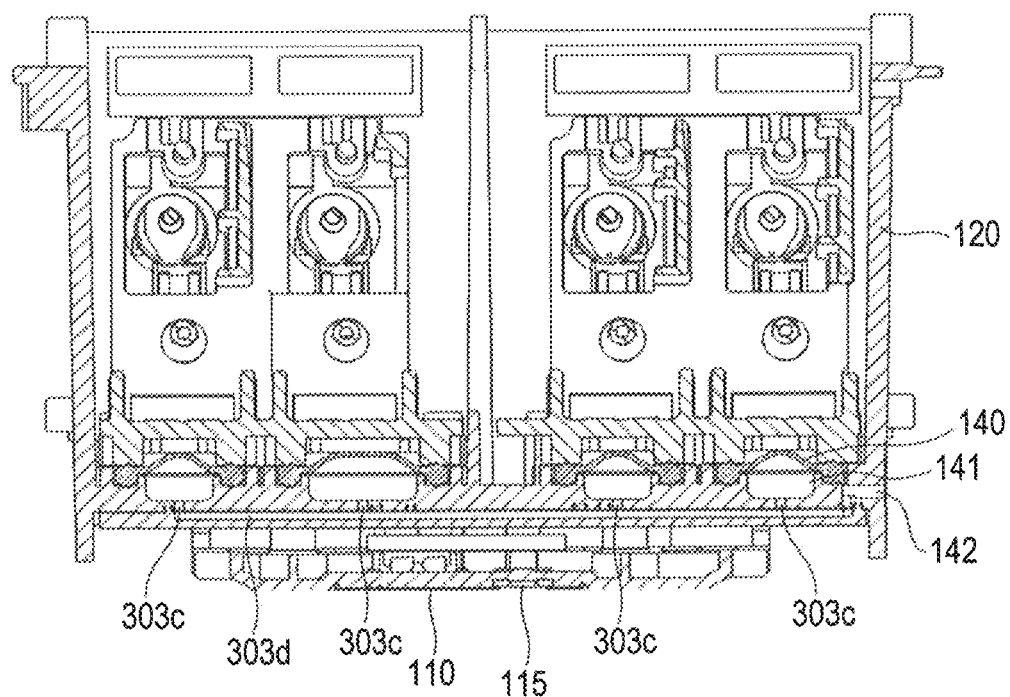
FIG. 5 is a schematic sectional view of the liquid storage units when viewed from the line 5-5 of FIG. 4.

Overview of Liquid Discharge Apparatus First, a schematic configuration and operation of a liquid discharge apparatus of the present invention are described with reference to FIGS. 1 to 5. FIG. 1 is a schematic top view illustrating the liquid discharge apparatus and an internal mechanism of liquid storage units. FIG. 2 is an overall perspective view of the liquid storage units on which liquid tanks are mounted. FIG. 3 is an exploded perspective view of the liquid storage units. FIG. 4 is an overall perspective view of the liquid storage units on which the liquid tanks are not mounted. FIG. 5 is a sectional view taken along the line 5-5 of FIG. 4.

A liquid discharge apparatus 10 is configured to record a color image or a monochrome image on a recording medium such as paper by using liquids (inks) of four colors, that is, yellow (Y), black (Bk), cyan (C), and magenta (M). The liquid contains pigments or dyes. As illustrated in FIG. 1, the liquid discharge apparatus 10 includes a liquid storage unit 130, a liquid discharge head 110, a carriage 200 on which the liquid storage unit 130 and the liquid discharge head 110 are mounted, a pressure control unit 300, and a paper feeding device (not shown). The liquid storage unit 130 is capable of holding liquid supplied from a liquid tank 160. A paper feeding tray (not shown) is arranged on a bottom surface of the liquid discharge apparatus 10. The recording medium stacked on the paper feeding tray is fed by the paper feeding device. The carriage 200 is supported on the liquid discharge apparatus 10 by a support rail (not shown), and is movable in the main scanning direction H orthogonal to the conveyance direction P of the recording medium. While the carriage 200 is moving in the main scanning direction H, the liquid discharge head 110 mounted on the carriage 200 discharges the liquid toward the recording medium, to thereby record an image on the recording medium.

The liquid storage unit 130 comprises a plurality of liquid storage units arranged corresponding to the colors of the liquids to be used in the liquid discharge apparatus 10. In this embodiment, four liquid storage units 130 are arrayed in the main scanning direction H. In each of the liquid storage units 130, yellow (Y), black (Bk), cyan (C), or magenta (M) liquid is filled. The liquid storage units of the respective colors are arrayed in the order of Y, Bk, C, and M from the left in FIG. 1. In this embodiment, two liquid storage units are integrated with each other, and two sets of the two integrated liquid storage units are arranged. Alternatively, the four liquid storage units may be arranged independently of each other. The four liquid storage units 130 are identical to each other except that the filled liquid is different therebetween.

Figure 6:
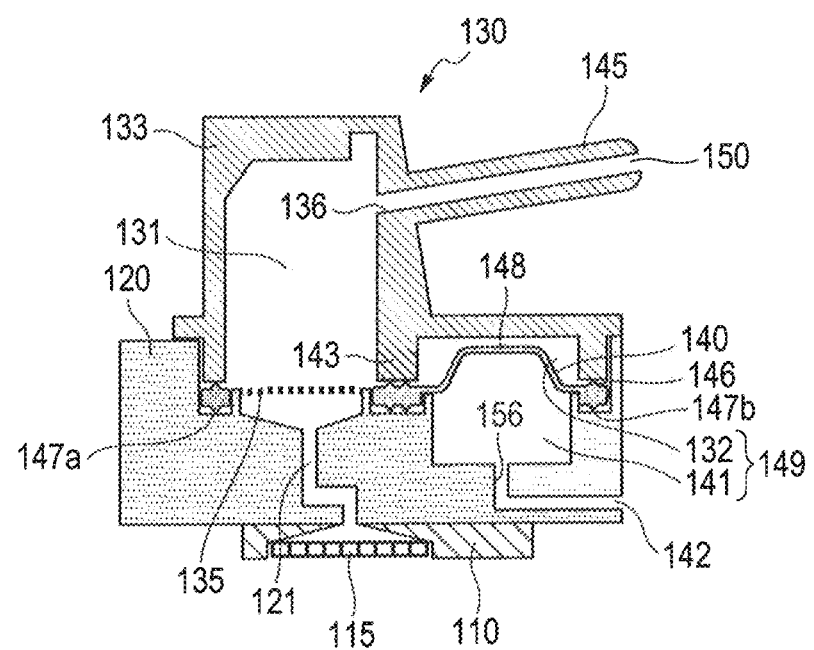
FIG. 6 is a schematic sectional view of the liquid storage unit when viewed from the line 6-6 of FIG. 4.

The liquid discharge head 110 is arranged on each liquid storage unit 130. In a surface of the liquid discharge head 110 that opposes to the recording medium, a plurality of discharge ports 115 configured to discharge the liquid are formed for the respective colors as illustrated in FIG. 6. The discharge ports 115 of the respective colors are arrayed in line in a direction parallel to the conveyance direction P of the recording medium. The liquid discharge apparatus 10 includes a main control unit (not shown) configured to centrally control the liquid discharge apparatus 10. An image signal is output from the main control unit and input to a head control board (not shown). Based on the image signal input to the head control board, the liquid discharge head 110 discharges the liquid toward the recording medium through the discharge ports 115. During the image formation, the liquid discharge head 110 is driven in the main scanning direction H to conduct reciprocating motion in the main scanning direction H.

To supply the liquid to the liquid storage unit 130 of each color, the liquid tank 160 may be mounted on the liquid storage unit 130. In each liquid tank 160, yellow (Y), black (Bk), cyan (C), or magenta (M) liquid is filled. As illustrated in FIG. 2, the liquid tank has a rectangular parallelepiped shape with its width dimension smaller than the dimensions in other directions. The liquid tank is mounted on the liquid storage unit 130 in such a posture that the front surface extends in a substantially vertical direction. The four liquid tanks 160 are identical to each other except that the filled liquid is different therebetween. A pressing lever 180 configured to press each liquid tank 160 to fix it to the liquid storage unit 130 is arranged on the liquid storage unit 130. The four pressing levers 180 are identical to each other except that the liquid tank 160 to be pressed is different therebetween.

Liquid Storage Unit 130

Figure 7A:
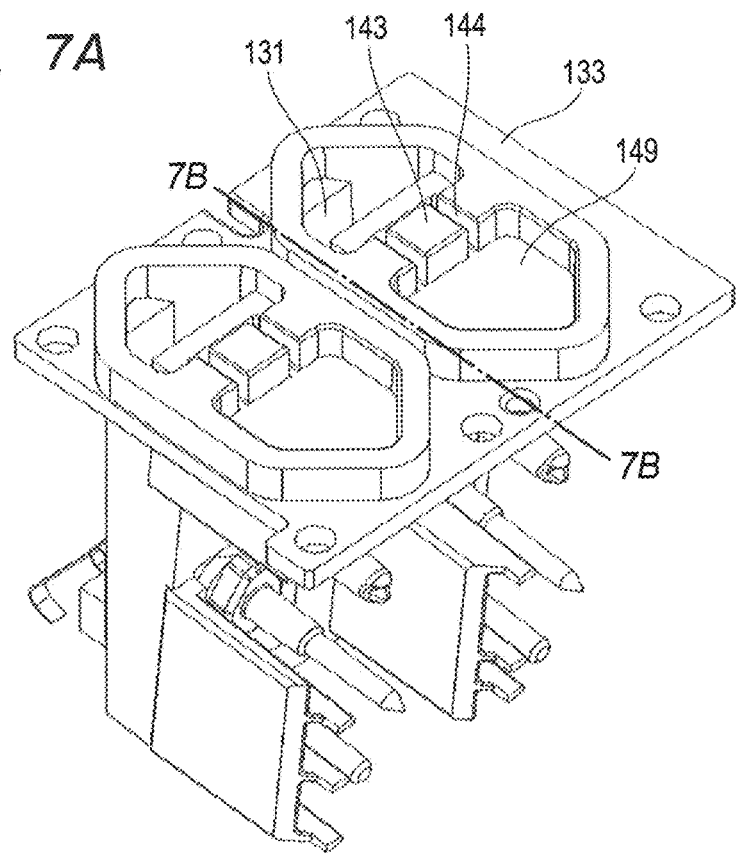
FIGS. 7A and 7B are conceptual views of a joint member.
Figure 7B:
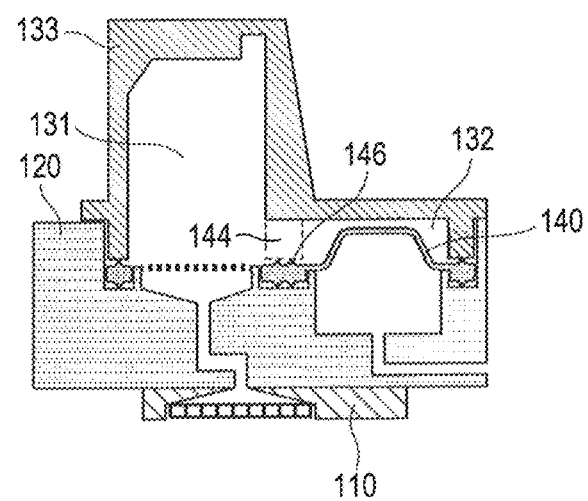
Figure 8A:
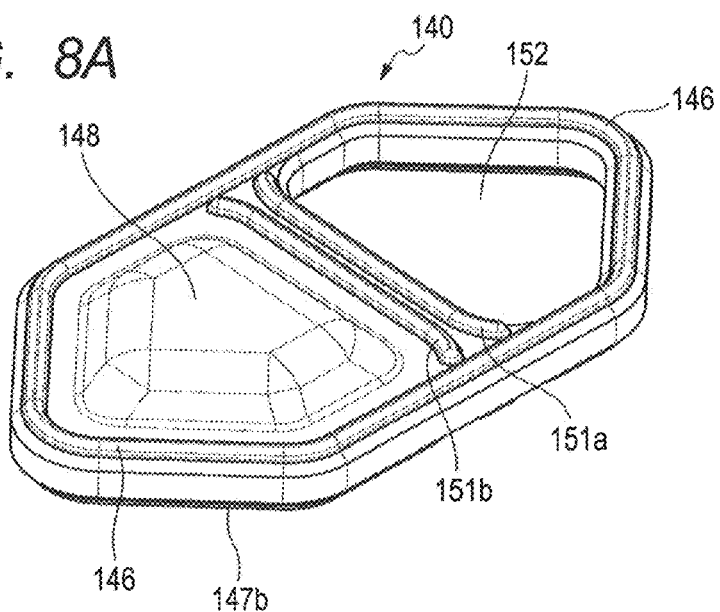
FIGS. 8A, 8B and 8C are conceptual views of an elastic member.
Figure 8B:
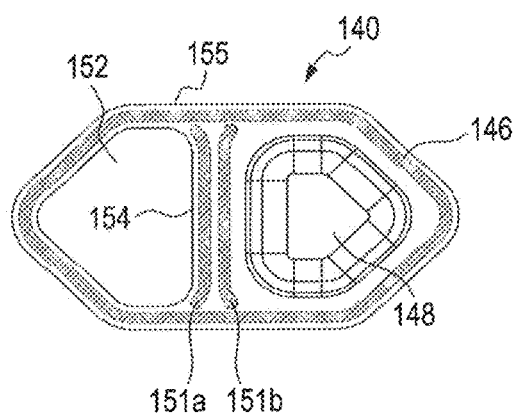
Figure 8C:
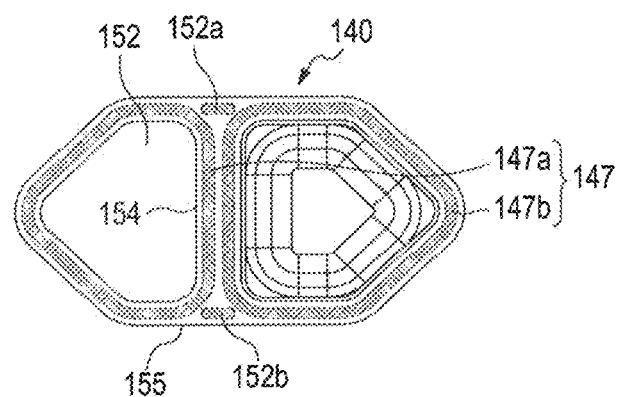

The liquid storage unit 130 is described in more detail with reference to FIGS. 6 to 8C. FIG. 6 is a sectional view of the liquid storage unit 130 taken along the line 6-6 of FIG. 4. FIG. 7A is a perspective view of a joint member, which is illustrated in an inverted posture unlike FIGS. 1 to 5 for a clear view of a seal surface to be brought into abutment against a seal member. FIG. 7B is a sectional view taken along the line 7B-7B of FIG. 7A. FIGS. 8A and 8B are a perspective view and a plan view (top view) of the seal member, respectively, for illustrating a seal portion to be brought into abutment against the joint member. FIG. 8C is a plan view (bottom view) of the seal member, for illustrating a seal portion to be brought into abutment against a liquid flow path member.

The liquid storage unit 130 includes a first liquid storage chamber 131, a second liquid storage chamber 132, and a pressure control chamber 141. The liquid tank 160 is mountable on the first liquid storage chamber 131, and the first liquid storage chamber 131 holds the liquid supplied from the liquid tank 160. The first liquid storage chamber 131 has a constant volume. The first liquid storage chambers 131 are arrayed adjacent to each other in the main scanning direction H. The first liquid storage chamber 131 includes a liquid supply tube 145 to which the liquid tank 160 is connected. The liquid supply tube 145 protrudes in a direction orthogonal to the main scanning direction H, and an end 150 of the liquid supply tube 145 engages with a supply port (not shown) of the liquid tank 160. The liquid of the liquid tank 160 flows through the liquid supply tube 145, and is supplied to the liquid storage chamber through an introduction port 136.

The second liquid storage chamber 132 communicates with the first liquid storage chamber 131 through a communication portion 144. The pressure control chamber 141 is formed adjacent to the second liquid storage chamber 132. The second liquid storage chamber 132 and the pressure control chamber 141 are positioned below the introduction port 136 of the first liquid storage chamber 131. The pressure control chamber 141 has an opening 156 connected to the pressure control unit 300 described later, and the pressure of the pressure control chamber 141 is changed through actuation of the pressure control unit 300. The second liquid storage chamber 132 and the pressure control chamber 141 are tightly partitioned from each other by an elastic member 148. The description "tightly partitioned" means that the air-tightness and the water-tightness are both satisfied. The elastic member 148 is deformable so as to increase and decrease the volume of the second liquid storage chamber 132 in accordance with the pressure of the pressure control chamber 141. The second liquid storage chamber 132 and the pressure control chamber 141 are collectively referred to as "elastic-member-storing chamber 149". The elastic-member-storing chamber 149 has a constant volume, and is partitioned into the second liquid storage chamber 132 and the pressure control chamber 141 by the elastic member 148. The first liquid storage chamber 131 is defined by a wall member having a lower air permeability per unit area than the elastic member 148. The wall member of the first liquid storage chamber 131 is thicker than the elastic member 148, and the area of the inner surface of the first liquid storage chamber 131 is larger than the surface area of the elastic member 148.

The first and second liquid storage chambers 131 and 132 and the pressure control chamber 141 are formed by a liquid flow path member 120, a joint member 133 positioned above the liquid flow path member 120, and a seal member 140 inserted between the liquid flow path member 120 and the joint member 133. The liquid flow path member 120 holds the liquid discharge head 110. The liquid flow path member 120 includes a flow path 121 connecting the first liquid storage chamber 131 to the liquid discharge head 110, and a liquid-holding member 135. The liquid-holding member 135 is positioned between the first liquid storage chamber 131 and the liquid discharge head 110 to function as a filter configured to filtrate the liquid. The liquid tank 160 is mounted on the joint member 133. The elastic member 148 has a thin structure to have high air permeability, but the first and second liquid storage chambers 131 and 132 are mostly formed by the joint member 133 and the liquid flow path member 120, and hence air is less liable to permeate the first and second liquid storage chambers 131 and 132. In this embodiment, the elastic member 148 is a part of the seal member 140. The liquid in the liquid tank 160 flows from the liquid supply tube 145 through the first liquid storage chamber 131 that is mainly formed by the joint member 133, and is supplied to the liquid discharge head 110 through the liquid-holding member 135 and the flow path.

The liquid supply tube 145 is integrated with the joint member 133 (first liquid storage chamber 131) for the purpose of cost reduction. It is preferred that the outer diameter of the liquid supply tube 145 be as small as possible to prevent leakage of the liquid under a state of engaging with the liquid tank 160. When the liquid tank 160 is mounted on the liquid supply tube 145 or when tumbling vibration is applied with the liquid supply tube 145 engaged with the liquid tank 160, however, a significant stress is generated in a base of the liquid supply tube 145, and the liquid supply tube 145 may be broken in some cases. Thus, the base of the liquid supply tube 145 may have a larger outer diameter and thickness.

It is preferred that the joint member 133 and the liquid flow path member 120 that form the first liquid storage chamber 131 be thicker for the purpose of reducing the air permeability. In the present invention, the first liquid storage chamber 131 has a constant volume, and hence there is no need to deform the first liquid storage chamber 131. Therefore, there is no limitation on the thicknesses of the joint member 133 and the liquid flow path member 120. To enhance sealing performance of the seal member 140, it is desired that the seal surfaces of the joint member 133 and the liquid flow path member 120 have as high flatness as possible. Considering those points, the joint member 133 and the liquid flow path member 120 are molded of a material obtained by adding fillers into a modified polyphenylene ether (PPE), which is a resin material excellent in mechanical strength and low in coefficient of thermal shrinkage.

When assembling the liquid storage unit 130, as illustrated in FIG. 3, a seal member 140 is mounted on the liquid flow path member 120 corresponding to each color, on which the liquid discharge head 110 is fixed. Next, as illustrated in FIG. 4, the joint member 133 corresponding to each color (in this embodiment, having an integrated configuration for two colors) is fixed onto the liquid flow path member 120 by screw fastening with the seal member 140 interposed therebetween. A liquid-holding member 137 described later is press-fitted to the joint member 133 in advance. The joint member 133 may be fixed onto the liquid flow path member 120 by ultrasonic welding, heat staking using a boss, ultrasonic staking, or the like.

The seal member 140 has a rib-shaped first seal portion 146 on its upper surface. Only one first seal portion 146 is arranged, and extends continuously so as to surround the first and second liquid storage chambers 131 and 132 and the pressure control chamber 141 (both of the first liquid storage chamber 131 and the elastic-member-storing chamber 149). The seal member 140 has two rib-shaped second seal portions 147a and 147b on its lower surface. The second seal portions 147a and 147b each abut against the top surface (seal surface) of the liquid flow path member 120 and respectively extend along the periphery of the first liquid storage chamber 131 and the peripheries of the second liquid storage chamber 132 and the pressure control chamber 141 (elastic-member-storing chamber 149) independently of each other. The first seal portion 146 and the second seal portion 147a extending along the periphery of the first liquid storage chamber 131 are configured to prevent leakage of the liquid in the first and second liquid storage chambers 131 and 132 to the outside. The second seal portion 147b surrounding the pressure control chamber 141 is configured to prevent, particularly when the elastic member 148 is deformed, leakage of the liquid from the second liquid storage chamber 132 to the pressure control chamber 141, and to prevent entry of air from the pressure control chamber 141 to the second liquid storage chamber 132. Those seal portions secure sealing between the joint member 133 and the outside including the pressure control chamber 141 and between the liquid flow path member 120 and the outside. Thus, the first and second liquid storage chambers 131 and 132 are formed into hermetic spaces except for the introduction port 136 for the liquid and the flow path 121 connected to the liquid discharge head 110.

The joint member 133 has a partition wall 143 configured to partition the first liquid storage chamber 131 and the second liquid storage chamber 132 (elastic-member-storing chamber 149) from each other. The partition wall 143 has the communication portion 144, which is a cutout opposing to projections 151a and 151b of the seal member 140 described later and connecting the first liquid storage chamber 131 and the second liquid storage chamber 132 to each other. That is, the partition wall 143 has a flat portion brought into abutment against the projections 151a and 151b and a recessed portion (communication portion 144) kept out of abutment against the projections 151a and 151b. As illustrated in FIG. 7B, the cutout or recessed portion allows the first liquid storage chamber 131 to communicate with the second liquid storage chamber 132, to thereby form an integrated space for storing the liquid. With the recessed portion, the structure of a die to be used for molding the joint member 133 is simplified, thereby being capable of enhancing the durability of the die.

Figure 9:
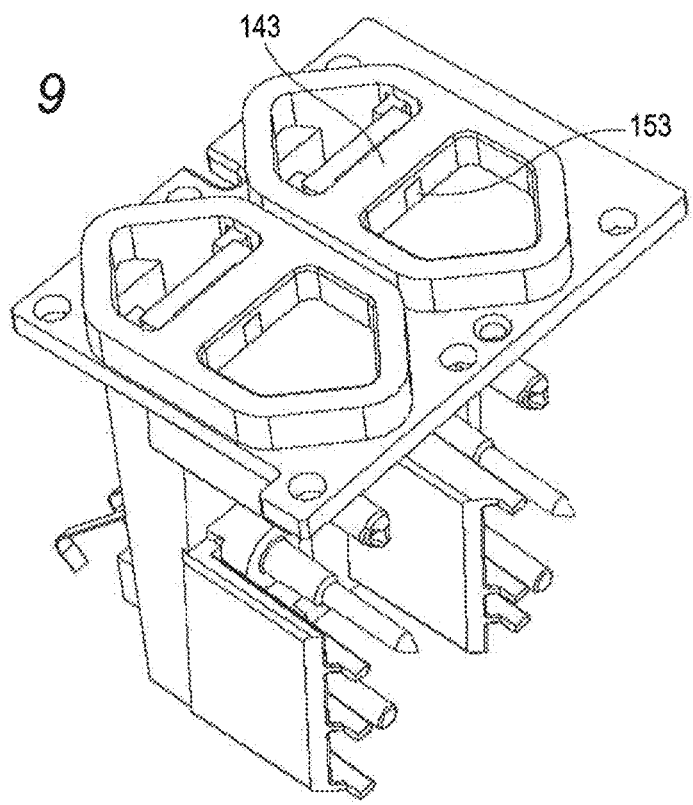
FIG. 9 is a schematic perspective view of a joint member according to another embodiment of the present invention.
Figure 10:
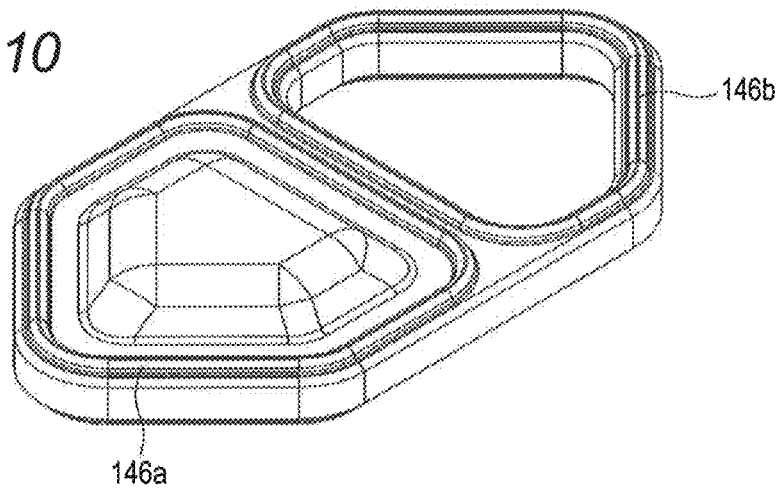
FIG. 10 is a conceptual view of a seal member to be combined with the joint member of FIG. 9.

The partition wall 143 of the joint member 133 may have a continuous top surface without the recessed portion. FIG. 9 is a perspective view of another joint member 133 when viewed in the same direction as that of FIG. 7A. FIG. 10 is a perspective view of a corresponding seal member 140 when viewed in the same direction as that of FIG. 8A. The partition wall 143 has a through-hole 153 connecting the first liquid storage chamber 131 and the second liquid storage chamber 132 to each other. That is, the communicating portion between the first liquid storage chamber 131 and the second liquid storage chamber 132 is not opened at the top surface of the partition wall 143 of the joint member 133. The seal member 140 has two first seal portions 146a and 146b abutting against the joint member 133 and respectively extending along the periphery of the elastic-member-storing chamber 149 and the periphery of the first liquid storage chamber 131 independently of each other. Second seal portions 147a and 147b are the same as those of the above-mentioned embodiment described with reference to FIGS. 7A and 7B. In this embodiment, the processing of a metal mold for the seal member 140 is simplified. The structure of a metal mold for the joint member 133 can be an inclined slide mold.

Seal Member 140 and Elastic Member 148

The configurations of the seal member 140 and the elastic member 148 are described in more detail. As described above, the elastic member 148 of this embodiment is formed as a part of the seal member 140. The seal member 140 has the elastic member 148 and an opening portion 152, which are partitioned from each other by a central coupling portion 154. As illustrated in FIGS. 3 and 6, the elastic member 148 is positioned on the liquid supply tube 145 side, whereas the opening portion 152 is positioned on an opposite side thereof. Further, the elastic members 148 are arrayed adjacent to each other in the main scanning direction H. The outer shape of the seal member 140 is a hexagonal shape, but is not limited thereto. As illustrated in FIG. 3, the seal member 140 corresponding to the color liquid may have a hexagonal shape, whereas the seal member 140 corresponding to the black liquid may have an octagonal shape. In the case of the hexagonal seal member 140, the elastic member 148 and the opening portion 152 both have a pentagonal shape, but the shape is not limited thereto. As illustrated in FIG. 3, the elastic member 148 corresponding to the color liquid may have a pentagonal shape, whereas the elastic member 148 corresponding to the black liquid may have a hexagonal shape.

The seal member 140 has the projections 151a, 151b, 152a, and 152b in a region that is on the side opposite to the region in which one of the first seal portion 146 and the pair of the second seal portions 147a and 147b is arranged and is a region in which the other is not arranged. Specifically, on a surface of the seal member 140 that opposes to the joint member 133, the first projections 151a and 151b extend along the central coupling portion 154. On a surface of the seal member 140 that opposes to the liquid flow path member 120, the second projections 152a and 152b extend along an outer peripheral portion 155 in the vicinity of intersection points between the outer peripheral portion 155 and the central coupling portion 154. When one seal portion is not arranged in a region that is on the side opposite to the region in which the other seal portion is arranged, the seal member 140 is not compressed equally from both sides, and hence the sealing performance may be degraded particularly under a high-temperature environment. With the projections, the seal member 140 is compressed equally from both sides, and hence satisfactory sealing performance can be maintained even under the high-temperature environment. The peak of the projection is rounded, but may be angulated. With the projection having an angulated peak, the screw fastening force can be reduced when fixing the joint member 133 onto the liquid flow path member 120 with screws.

As described above, the first seal portion 146 brought into abutment against the joint member 133 is arranged so as to surround the first and second liquid storage chambers 131 and 132 and the pressure control chamber 141. The second seal portions 147a and 147b brought into abutment against the liquid flow path member 120 are arranged so as to surround the first liquid storage chamber 131 and surround the second liquid storage chamber 132 and the pressure control chamber 141 individually, and are not coupled to each other. Therefore, when the seal member 140 is erroneously mounted upside down, the first and second liquid storage chambers 131 and 132 communicate with the atmosphere through the communication portion 144 as a cutout or recessed portion, with the result that the hermeticity of the first and second liquid storage chambers 131 and 132 is decreased. The decrease in hermeticity may affect a bubble returning function. When a leakage test is conducted, it can be detected whether or not the seal member 140 is mounted upside down. A leakage test for the first seal portion 146 and the second seal portion 147a surrounding the first liquid storage chamber 131 is conducted by introducing air to the first liquid storage chamber 131 through the liquid supply tube 145 to pressurize the first liquid storage chamber 131 (first leakage test). A leakage test for the second seal portion 147b surrounding the pressure control chamber 141 is conducted by introducing air to the pressure control chamber 141 through a decompression port 142 to pressurize the pressure control chamber 141 (second leakage test). The first leakage test and the second leakage test are conducted individually. To enhance the sealing performance, the two second seal portions 147a and 147b may be coupled to each other to surround the first and second liquid storage chambers 131 and 132 and the pressure control chamber 141 in one loop.

The seal member 140 is integrally molded of rubber, including various portions such as the elastic member 148, the outer peripheral portion 155, the central coupling portion 154, and the first and second seal portions 146a, 146b, 147a, and 147b as described above. To realize high deformation performance of the elastic member 148, liquid contact property with the liquid to be used, followability of the seal portion, and the like, the seal member 140 may be formed of, for example, ethylene propylene diene monomer (EPDM) rubber. When the joint member 133 and the liquid flow path member 120 are formed of modified PPE containing fillers, the fillers may be exposed on the seal surface due to fluctuation of a cooling state during the molding. Even when the fillers are exposed to cause fluctuation of the flatness of the seal surface, satisfactory sealing performance can be secured by using EPDM. As the seal member 140, chlorinated butyl rubber or the like may be used as well.

Figure 11:
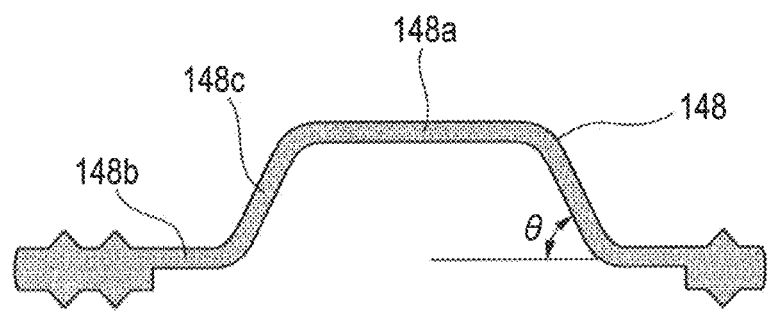
FIG. 11 is a sectional view of the elastic member.

FIG. 11 is a sectional view of the elastic member 148. The elastic member 148 has a convex sectional shape protruding to an opposite side of the pressure control chamber 141. Specifically, the elastic member 148 has a flat outer peripheral portion 148b, a flat inner peripheral portion 148a, and an intermediate portion 148c connecting the outer peripheral portion 148b and the inner peripheral portion 148a to each other and being inclined relative to the outer peripheral portion 148b and the inner peripheral portion 148a. In a bubble returning process described later, the elastic member 148 is deformed so that the convex portion is oriented in an opposite direction, that is, toward the pressure control chamber 141 side (is inverted) due to a negative pressure of the pressure control chamber 141. When the negative pressure is released, the elastic member 148 is restored to the original shape due to its elastic restoration force. The elastic member 148 may be convex toward the pressure control chamber 141 side (lower side in FIG. 5). In this case, the pressure control chamber 141 is pressurized with use of the pressure control unit 300. It is preferred that the hardness (rubber hardness) of the elastic member 148 be about 20 degrees to 70 degrees from the viewpoint of restorability to the original shape.

The intermediate portion 148c is inclined relative to the outer peripheral portion 148b at an angle θ of more than 0 degrees and less than 90 degrees, preferably more than 0 degrees and less than 65 degrees. With this shape, when the elastic member 148 is deformed, the volume of the second liquid storage chamber 132 is changed significantly, thereby reducing the number of times of the bubble returning process. When the inclination angle is equal to or more than 90 degrees, the elastic member 148 is not restored to the original shape in some cases due to resistance generated at the supporting point of the inversion at the time of inversion.

The outer peripheral portion 148b of the elastic member 148 is thicker than the inner peripheral portion 148a. Thus, the restoration force to be generated when the elastic member 148 is inverted becomes greater, with the result that the elastic member 148 is easily restored to the original shape. It is preferred that the thickness of the outer peripheral portion 148b be about 0.5 mm to 1.3 mm, that the thickness of the inner peripheral portion 148a be about 0.2 mm to 1.0 mm, and that the thickness of the outer peripheral portion 148b be 1.5 times or more as large as the thickness of the inner peripheral portion 148a.

Elastic members 148 according to other embodiments of the present invention are described with reference to FIGS. 12 to 14. In those embodiments, the thickness of the elastic member 148 (a sheet in the embodiment of FIG. 14) is uniform, preferably about 0.5 mm to 1.3 mm.

Figure 12:
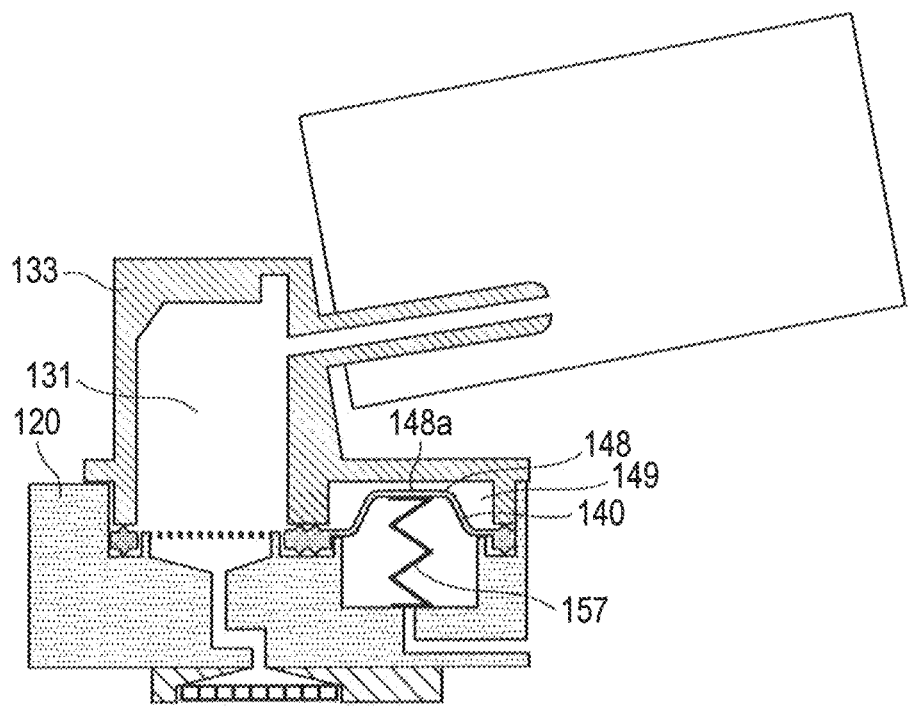
FIG. 12 is a sectional view of an elastic member according to another embodiment of the present invention.

In the embodiment illustrated in FIG. 12, a coil spring 157 configured to bias the elastic member 148 is arranged between the inner peripheral portion 148a of the elastic member 148 and a bottom surface of the elastic-member-storing chamber 149. The spring 157 may be arranged on a top surface of the elastic-member-storing chamber 149. With the spring 157, the restoration force of the elastic member 148 is increased so that the elastic member 148 is easily restored to the original shape. As a result, the reliability of bubble returning is enhanced.

Figure 13:
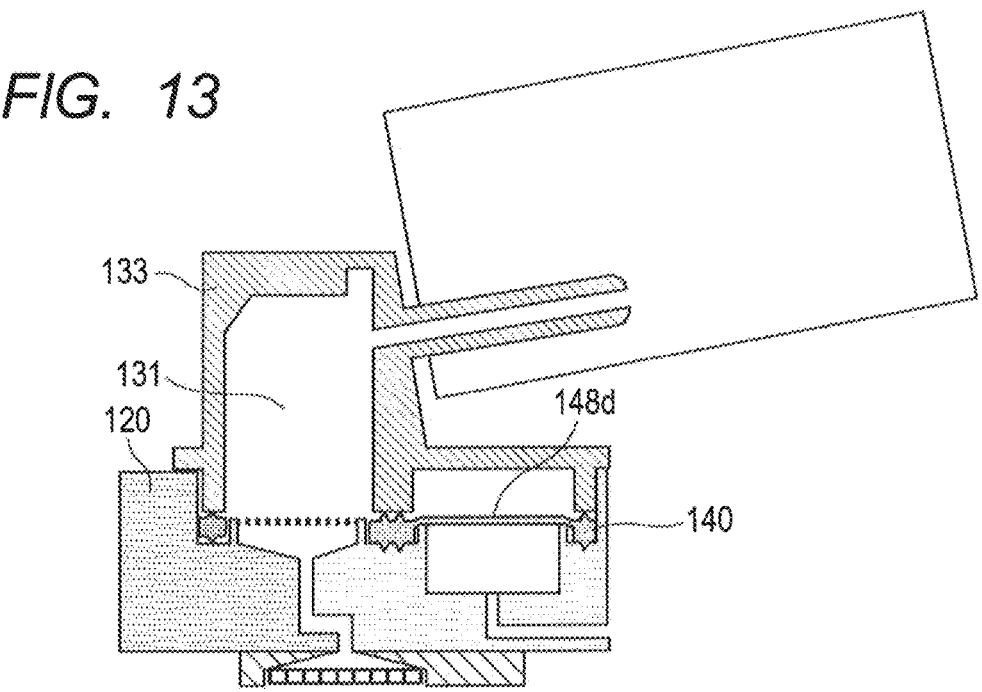
FIG. 13 is a sectional view of an elastic member according to another embodiment of the present invention.

In the embodiment illustrated in FIG. 13, an elastic member 148d has a circular or elliptical planar shape. The elastic member 148d has no folding or ridge line, and hence the resistance generated at the supporting point of the inversion at the time of inversion is small. The elastic member 148d is deformed continuously, and hence stable restorability can be obtained.

Figure 14:
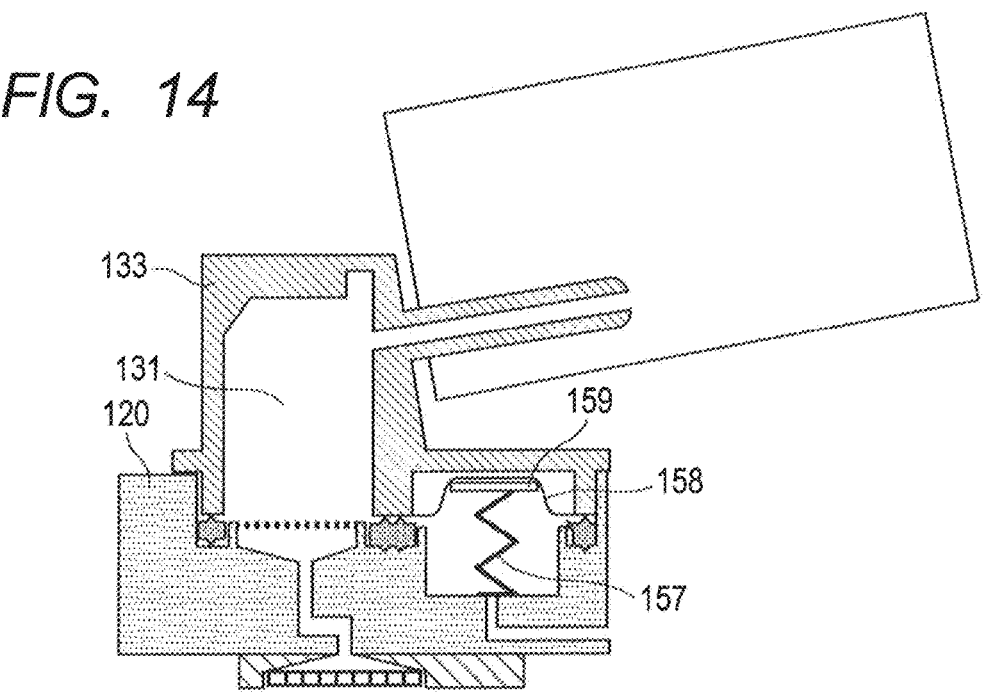
FIG. 14 is a sectional view of an elastic member according to another embodiment of the present invention.

In the embodiment illustrated in FIG. 14, the elastic member 148 includes a flexible sheet 158 fixed to the joint member 133 by welding and includes the spring 157 being configured to bias the sheet 158 and having one end supported on the sheet 158 and the other end supported on the liquid flow path member 120. It is preferred that the sheet 158 be formed of the same material as that of the joint member 133. The flexible sheet 158 may be fixed to the liquid flow path member 120, and the other end of the spring 157 may be supported on the joint member 133. A plate 159 is fixed to the end portion of the spring 157, and the spring 157 is fixed to the sheet 158 through the plate 159. The sheet 158 is fixed so as to be able to be bent after the welding. The sheet 158 has smaller resistance generated at the supporting point of the inversion at the time of inversion than the above-mentioned elastic member 148 formed of EPDM or chlorinated butyl rubber, and hence stable restorability can be obtained.

Figure 15:
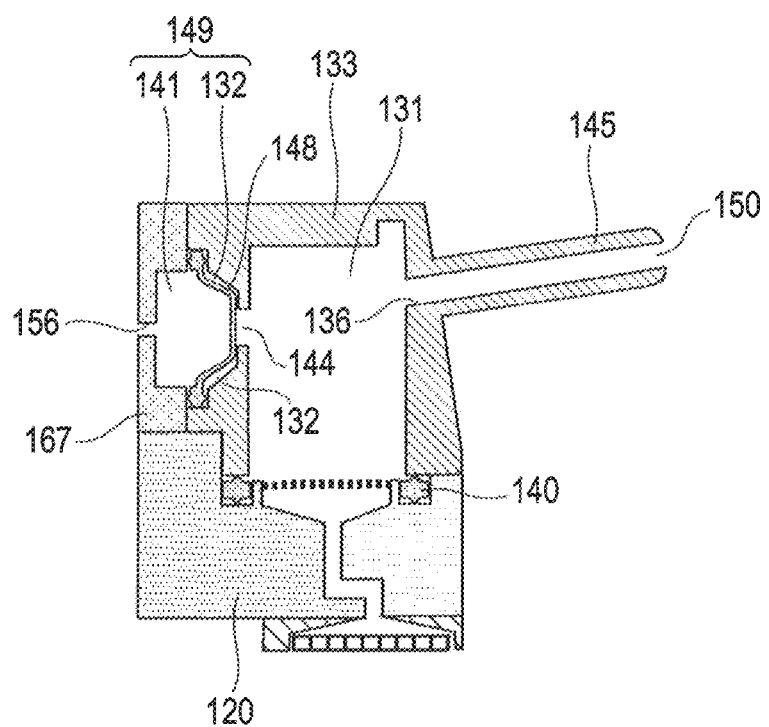
FIG. 15 is a schematic sectional view of a liquid storage unit according to another embodiment of the present invention.

The elastic member 148 may be arranged independently of the seal member 140. Referring to FIG. 15, the second liquid storage chamber 132 and the pressure control chamber 141 (elastic-member-storing chamber 149) are formed adjacent to the joint member 133 at an upper part of the joint member 133. The joint member 133 has a communication portion 144 connecting the second liquid storage chamber 132 to the first liquid storage chamber 131. The second liquid storage chamber 132 is positioned on a side surface on an opposite side of the introduction port 136 of the first liquid storage chamber 131. The elastic member 148 is fixed to an elastic member retaining plate 167 by heat or ultrasonic welding, heat staking, or clamping with screws. In this embodiment, the elastic-member-storing chamber 149 is defined by the joint member 133 and the elastic member retaining plate 167, and is partitioned into the second liquid storage chamber 132 and the pressure control chamber 141 by the elastic member 148. The communication portion 144 is positioned above a point corresponding to a half of the total height of the first liquid storage chamber 131. Because bubbles stagnate in an upper portion, the volume of the second liquid storage chamber 132 is changed through the deformation of the elastic member 148 in the vicinity of the bubbles, thereby being capable of moving the bubbles with a greater force. Thus, the efficiency of returning the bubbles into the liquid tank 160 is enhanced.

Meniscus Holding Structure for Liquid

Figure 16A:
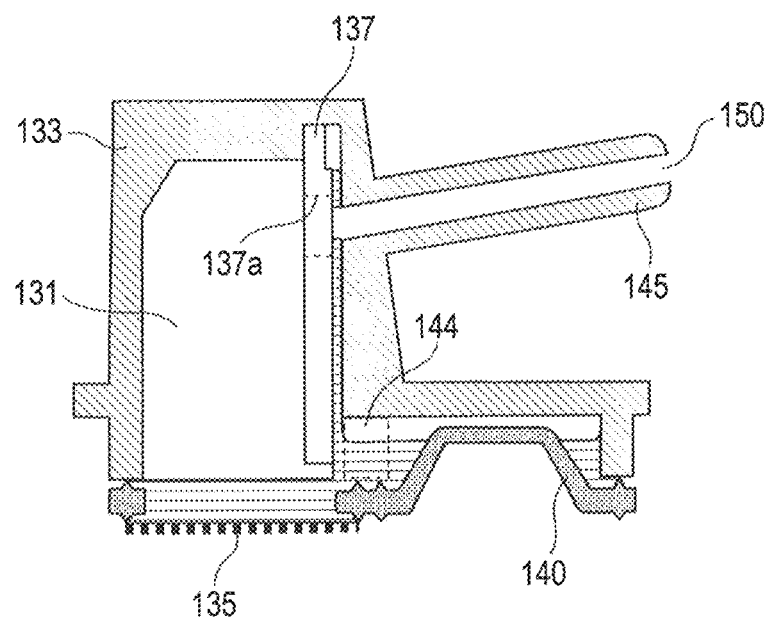
FIGS. 16A and 16B are schematic sectional views illustrating a configuration of a meniscus holding structure.

A meniscus holding structure for liquid is described with reference to FIGS. 16A and 16B. As illustrated in FIG. 16A, the liquid-holding member 137 is arranged in the first liquid storage chamber 131. A minute clearance (for example, 0.1 mm to 0.3 mm) is formed between the liquid-holding member 137 and an inner wall of the joint member 133 so that a meniscus portion of the liquid is formed between the liquid-holding member 137 and the wall surface of the joint member 133. The liquid is held in the meniscus portion, and hence, even when the liquid tank 160 is removed from the liquid supply tube 145, the liquid-holding member 135 maintains a state of being covered with the liquid, thereby being capable of constantly retaining the liquid in the liquid discharge head 110. The same effect can also be expected immediately after the liquid tank 160 is mounted on the liquid supply tube 145. When printing is continuously performed under a state in which the liquid-holding member 135 is exposed, an air path is formed above the liquid-holding member 135, with the result that the liquid cannot continuously be supplied from the liquid tank 160 to the liquid discharge head 110. Thus, when the liquid is not present on the liquid-holding member 135, a cap recovery process or a liquid loading process using the liquid tank 160 is necessary under a state in which the liquid tank 160 of each color is mounted. As a result, the waiting period is increased due to the above-mentioned processes when printing is desired immediately after the used liquid tank 160 is removed and a new liquid tank 160 is mounted. In this embodiment, the liquid is constantly held between the introduction port 136 and the liquid-holding member 135 due to a force of the meniscus generated by the liquid-holding member 137, and the liquid is supplied to the liquid-holding member 135, thereby being capable of starting the printing immediately after the liquid tank 160 is mounted.

Figure 16B:
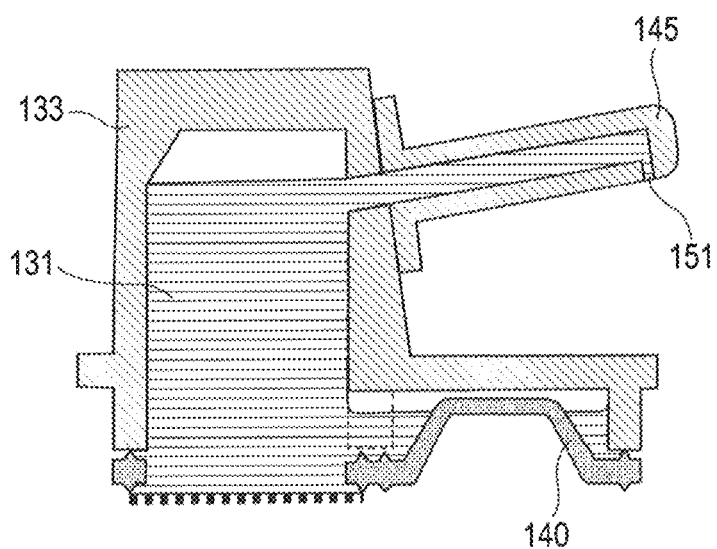

As illustrated in FIG. 16B, an inlet opening 151 for forming the meniscus portion may be formed in the liquid supply tube 145. The flow path of the liquid supply tube 145 is bent by a right angle in the vicinity of the end portion on an opposite side of the first liquid storage chamber 131 and penetrates the tube wall of the liquid supply tube 145 to open at the side wall of the liquid supply tube 145. The inlet opening 151 is reduced in sectional area as compared to the flow path in the other part of the liquid supply tube 145. For example, the inner diameter of the liquid supply tube 145 is set to φ 1 mm to 2 mm, and the inner diameter of the inlet opening 151 is set to φ 0.3 mm to 0.5 mm, with the result that the meniscus portion of the liquid can be formed in the inlet opening 151. Thus, the above-mentioned liquid-holding member 137 is unnecessary. The liquid supply tube 145 having the inlet opening 151 as described above cannot be molded integrally with the joint member 133, and hence the liquid supply tube 145 and the joint member 133 are manufactured separately and then joined to each other. The liquid supply tube 145 and the joint member 133 may be joined to each other by, for example, heat welding, ultrasonic welding, bonding, or screw fastening or heat staking with the seal member 140 interposed therebetween.

Bubble Returning Mechanism and Bubble Returning Process

Figure 17A:
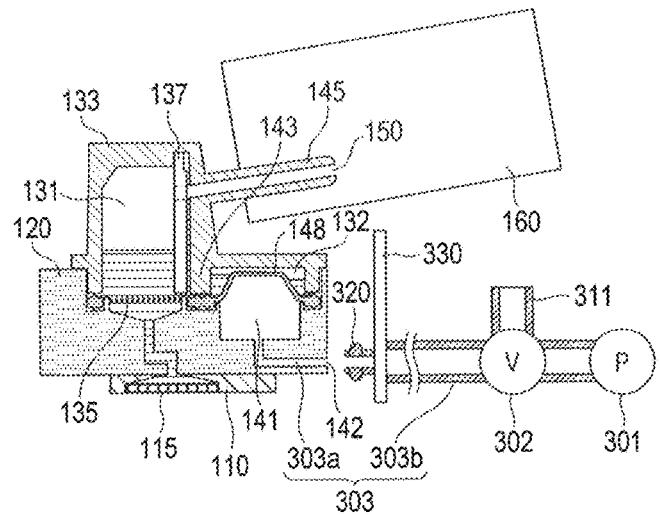
FIGS. 17A, 17B and 17C are views illustrating a bubble returning mechanism and a bubble returning process.

A bubble returning mechanism and the bubble returning process are described with reference to FIGS. 17A to 17C. As illustrated in FIG. 17A, the bubble returning mechanism of the liquid discharge apparatus 10 includes the pressure control unit 300 connected to the pressure control chamber 141. The pressure control unit 300 includes a decompression flow path 303 connected to the pressure control chamber 141, a pump 301 positioned on the decompression flow path 303, and a motor (not shown) configured to drive the pump 301. The pressure control unit 300 further includes a flow path switching portion 302 positioned on the decompression flow path and between the pump 301 and the pressure control chamber 141, and an atmosphere release tube 311 branched from the decompression flow path 303 at the flow path switching portion 302. The flow path switching portion 302 is a valve configured to switch the pump 301 and the atmosphere release tube 311 therebetween. The decompression flow path 303 includes a first flow path 303a being formed in the liquid storage unit (liquid flow path member 120) and connecting the pressure control chamber 141 and the decompression port 142 to each other, and a second flow path 303b connecting the decompression port 142 to the pump 301 or the atmosphere release tube 311. In this embodiment, the second flow path 303b is a tube, and the pump 301 is a tube pump including a rotator configured to press the tube, but the second flow path 303b and the pump 301 are not limited thereto. The pump 301 of this embodiment is configured to decompress the pressure control chamber 141, but is also capable of pressurizing the pressure control chamber 141.

In the bubble returning process, the elastic member 148 is deformed repeatedly so that the bubbles (air and liquid) in the first liquid storage chamber 131 are removed and returned into the liquid tank 160. The bubble returning process is executed when filling the liquid of the liquid tank 160 to the first liquid storage chamber 131 for the first time, or when replacing the used liquid tank 160 with a new liquid tank 160. The used liquid tank 160 is replaced with the new liquid tank 160 when the remaining amount of the liquid of the first liquid storage chamber 131 becomes equal to or less than a predetermined amount. The bubble returning process may be executed periodically or in response to a command from a user. Further, the bubble returning process may be executed when activating the recording apparatus after the recording apparatus is not used for a long period of time. In this case, air may permeate the first liquid storage chamber 131 to contain bubbles in the first liquid storage chamber 131.

Referring to FIG. 17A, the liquid of the liquid tank 160 is consumed, and the liquid of the first liquid storage chamber 131 is partially consumed as well. A suction pad 320 and the second flow path 303b that are coupled to a guide unit 330 are arranged on a side surface of the paper feeding device, and the second flow path 303b is connected to the pump 301. The first flow path 303a passes through the liquid flow path member 120 to connect the pressure control chamber 141 and the decompression port 142 to each other. Next, as illustrated in FIG. 17B, the carriage 200 is moved so that the liquid storage unit 130 mounted on the carriage 200 is moved in the main scanning direction H. When the carriage 200 reaches the right end portion of the liquid discharge apparatus 10, the decompression port 142 formed in the liquid flow path member 120 abuts against the suction pad 320. The suction pad 320 is formed of such an elastic member that the air-tightness is enhanced to the extent possible. After that, the consumed liquid tank 160 is replaced with a new liquid tank 160. The carriage 200 may be moved after the liquid tank 160 is replaced in advance.

Next, the pump 301 is actuated. Due to the air-tightness of the suction pad 320, the pump 301 discharges air in the pressure control chamber 141 through the decompression flow path 303 and the flow path switching portion 302, to thereby decompress the pressure control chamber 141. As illustrated in FIG. 5, the first flow path 303a includes individual flow paths 303c connected to the pressure control chambers 141 of the respective liquid storage units 130 and includes a common flow path 303d connecting the respective individual flow paths 303c to the pump 301 through the decompression port 142 and the flow path switching portion 302. Thus, all the pressure control chambers 141 can be decompressed at the same time only by connecting the suction pad 320 to the decompression port 142. The elastic member 148 is pulled toward the pressure control chamber 141 side so that the elastic member 148 is inverted. As a result, the volume of the second liquid storage chamber 132 is increased, and the liquid corresponding to the increased volume is introduced into the first liquid storage chamber 131 from the liquid tank 160.

Figure 17B:
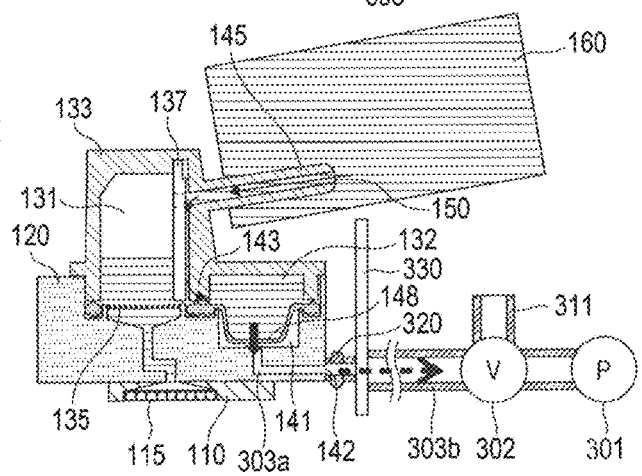
Figure 17C:
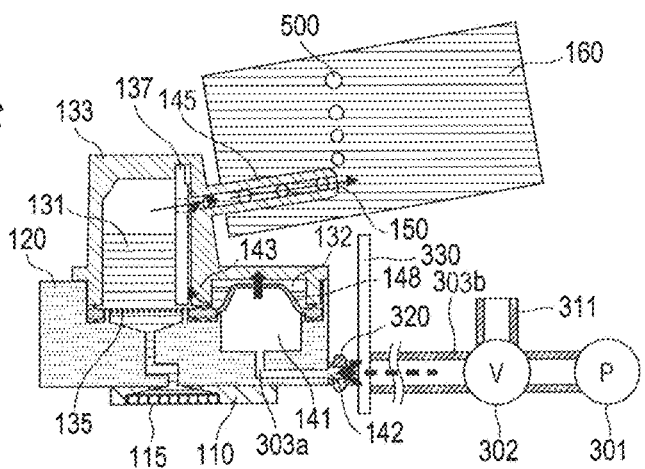

Next, as illustrated in FIG. 17C, the pressure control chamber 141 is opened to the atmosphere. Specifically, the flow path switching portion 302 is switched to the atmosphere release tube 311 so that the pressure control chamber 141 is opened to the atmosphere through the decompression flow path 303, the flow path switching portion 302, and the atmosphere release tube 311. The pressure control chamber 141 has the atmospheric pressure again, and the elastic member 148 is restored to the original shape due to the elastic restoration force, with the result that the pressure in the pressure control chamber 141 is increased. The liquid-holding member 137 has an opening 137a formed at a position opposing to the introduction port 136 of the first liquid storage chamber 131, and bubbles 500 present mainly in an upper part of the first liquid storage chamber 131 pass through the opening 137a and move from the introduction port 136 to the liquid tank 160. Next, the atmosphere released state of the pressure control unit 300 is terminated, and the pressure control chamber 141 is decompressed by the pump 301. Then, the pressure control chamber 141 is opened to the atmosphere. Subsequently, the decompression of the pressure control chamber 141 using the pump 301 and the opening of the pressure control chamber 141 to the atmosphere are repeated so that the elastic member 148 acts as a pump, thereby being capable of efficiently moving the bubbles in the first liquid storage chamber 131 to the liquid tank 160.

In the embodiment in which the liquid-holding member 137 is not arranged as illustrated in FIG. 16B, the bubbles directly flow from the first liquid storage chamber 131 into the liquid supply tube 145, and are returned into the liquid tank 160. When returning the bubbles, the liquid stagnating in the meniscus portion is not returned into the liquid tank 160, and hence the bubbles stagnating in the upper part of the joint member 133 can be returned into the liquid tank 160 more efficiently.

When the pressure for inverting the elastic member 148 is extremely small (for example, 3 KPa to 8 KPa), the deformation of the elastic member 148 becomes smaller, and hence the amount of the liquid to be introduced from the liquid tank 160 is decreased. As a result, the amount of the bubbles to be returned into the liquid tank 160 per bubble returning process is decreased, and hence the efficiency of returning the bubbles is degraded. When the pressure for inverting the elastic member 148 is excessively large as described later, on the other hand, the meniscus at the discharge ports 115 of the liquid discharge head 110 is broken, with the result that liquid droplets may be exposed to the outside of the discharge ports 115. When the liquid droplets are exposed to the outside of the discharge ports 115, the colors may be mixed between the color liquids. Further, when the discharge port surface is covered with the liquid to close the discharge ports 115, the liquid discharge direction is fluctuated, which may result in unsatisfactory printing. Thus, the actuation pressure of the pump 301 is set so that the elastic member 148 is inverted with such a pressure as to avoid the breakage of the meniscus (for example, 8 KPa to 30 KPa).

Figure 18A:
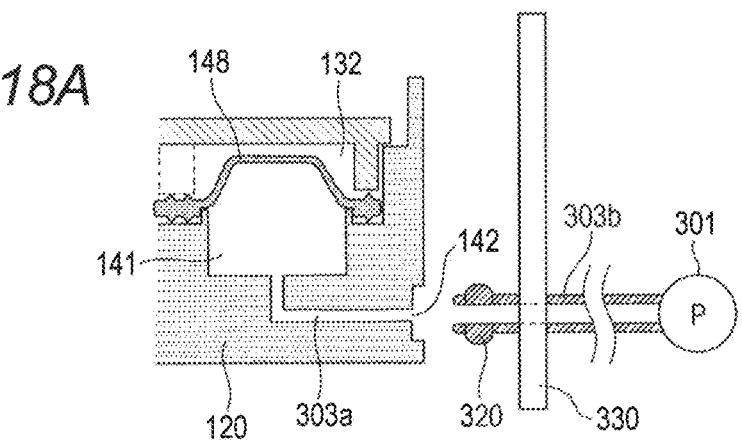
FIGS. 18A, 18B and 18C are views illustrating a bubble returning mechanism and a bubble returning process according to another embodiment of the present invention.
Figure 18B:
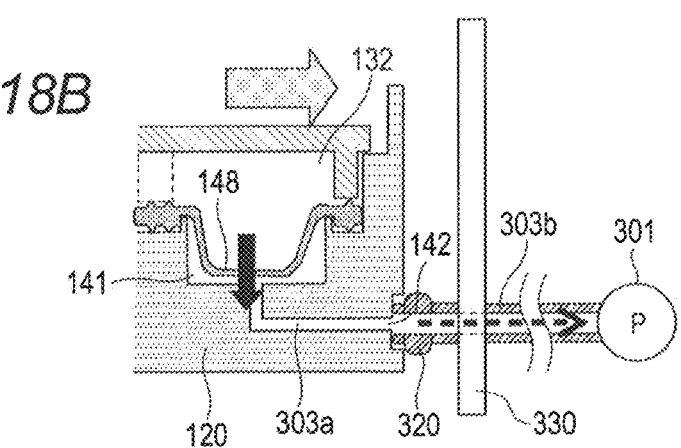
Figure 18C:
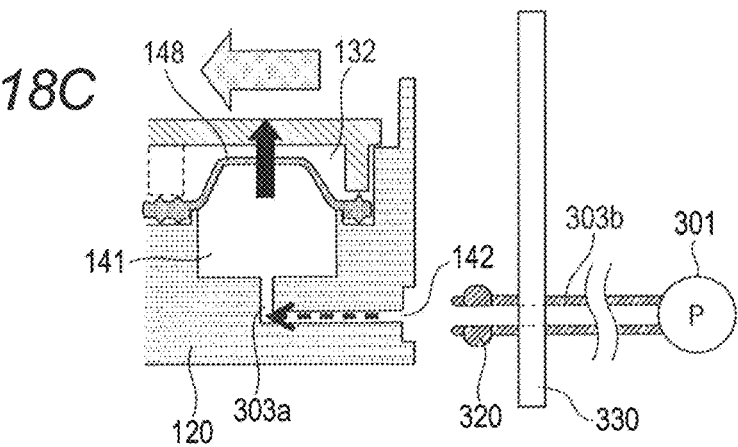

FIGS. 18A to 18C illustrate a bubble returning mechanism according to another embodiment of the present invention. In this embodiment, the carriage 200 is moved to separate the decompression port 142 from the suction pad 320, to thereby open the pressure control chamber 141 to the atmosphere. The first flow path 303a inside the liquid flow path member 120 and the second flow path 303b outside the liquid flow path member 120 are connectable to and disconnectable from each other through the movement of the carriage 200 in the main scanning direction H. Referring to FIG. 18A, the suction pad 320 is separated from the decompression port 142, and hence the pressure control chamber 141 does not communicate with the pump 301. Next, as illustrated in FIG. 18B, the carriage 200 having the liquid storage unit 130 mounted thereon is moved in a direction of the suction pad 320, and the decompression port 142 is brought into close contact with the suction pad 320. The pressure control chamber 141 communicates with the pump 301 through the second flow path 303b. The pump 301 is activated to decompress the pressure control chamber 141 through the first and second flow paths 303a and 303b. As a result, the elastic member 148 is inverted to decompress the pressure control chamber 141. The operation described above is similar to the operation illustrated in FIGS. 17A and 17B. Next, as illustrated in FIG. 18C, the carriage 200 having the liquid storage unit 130 mounted thereon is moved in the opposite direction, to thereby separate the decompression port 142 from the suction pad 320. The pressure control chamber 141 is opened to the atmosphere through the first flow path 303a, and thus the elastic member 148 is restored to the original shape. In this embodiment, the flow path switching portion 302 and the atmosphere release tube 311 are unnecessary, thereby being capable of simplifying the configuration of the liquid discharge apparatus 10.

As described above, in the present invention, the bubble returning process can be executed with a simple configuration including the elastic member 148 and the deformation unit for the elastic member 148. Thus, the bubbles can be securely returned into the liquid tank 160, thereby reducing the risk of affecting the liquid. There is no need to deform the joint member 133 itself, and hence the mechanism for deforming the joint member 133 is unnecessary. Further, the joint member 133 can have a thick rigid configuration. As a result, the air permeability of the first liquid storage chamber 131 is reduced, and bubbles are less liable to be generated in the first liquid storage chamber 131. Therefore, the frequency of the bubble returning process can be reduced.

Color Mixing Preventing Mechanism

In the present invention, the first liquid storage chamber 131 is pressurized so as to return bubbles into the liquid tank 160. It is possible to prevent breakage of the meniscus at the discharge ports 115 by appropriately setting the actuation pressure of the pump 301, but in some cases, it is difficult to prevent breakage of the meniscus at the discharge ports 115 simply by setting the actuation pressure of the pump 301 due to various limitations. Therefore, an additional configuration for maintaining the meniscus at the discharge ports 115 is described. First, the relationship between the meniscus and the pressure of the first liquid storage chamber 131 is described with reference to FIGS. 17A to 17C.

In FIG. 17A, the pressure control chamber 141 communicates with the atmosphere, and the first liquid storage chamber 131 is not affected by the negative pressure of the liquid tank 160 or the pressure change due to the displacement of the elastic member 148. The liquid remaining inside the first liquid storage chamber 131 is held by a meniscus force generated at the discharge ports 115 of the liquid discharge head 110 and a meniscus force generated between the joint member 133 and the liquid-holding member 137.

In FIG. 17B, a new liquid tank 160 is mounted, the pressure control chamber 141 is decompressed by the pump 301, and hence the elastic member 148 is inverted. The volume of the second liquid storage chamber 132 is increased, and liquid in an amount corresponding to the increased volume is introduced into the first liquid storage chamber 131 from the liquid tank 160. In order to maintain the meniscus at the discharge ports 115, the meniscus force at the discharge ports 115 is raised to be larger than the negative pressure of the liquid tank 160. In order to invert the elastic member 148 to draw the liquid from the liquid tank 160, it is necessary to raise the negative pressure generated in the first liquid storage chamber 131 by the inversion of the elastic member 148 to be larger than the negative pressure of the liquid tank 160. Further, in order to maintain the meniscus at the discharge ports 115, the meniscus force at the discharge ports 115 is required to be larger than the negative pressure generated by the inversion of the elastic member 148.

In FIG. 17C, the pressure control chamber 141 is opened to the atmosphere to restore the elastic member 148, and thus the bubbles 500 in the first liquid storage chamber 131 are pushed out to move into the liquid tank 160. The bubbles present between the first liquid storage chamber 131 and the liquid-holding member 137 are required to break the meniscus at the liquid-holding member 137 to return into the liquid tank 160, and hence the pressure generated by the restoration of the elastic member 148 is required to be larger than the meniscus force of the liquid-holding member 137. Further, when the pressure generated by the restoration is larger than the meniscus force at the discharge ports 115, the meniscus at the discharge ports 115 is broken, and the liquid in the liquid discharge head 110 leaks out from the discharge ports 115. When the liquids of the respective colors overflowing from the discharge ports 115 are mixed with each other, a color different from an original color is generated, which affects the printing.

In view of the above, it is necessary to satisfy the following relationship:

(meniscus force at discharge ports 115)>(pressure generated in first liquid storage chamber 131 through restoration of elastic member 148)>(meniscus force at liquid-holding member 137).

Therefore, in the bubble returning process, the pressure generated in the first liquid storage chamber 131 when the elastic member 148 is restored is required to be smaller than the meniscus force at the discharge ports 115 of the liquid discharge head 110. Therefore, in the following embodiment, a flow resistance increase portion 400 is arranged. The flow resistance is increased at the periphery of the flow resistance increase portion 400, and thus the flow resistance increase portion 400 can decrease the pressure generated in the first liquid storage chamber 131 when the elastic member 148 is restored so as to be smaller than the meniscus force at the discharge ports 115 of the liquid discharge head 110. The flow resistance increase portion 400 generally has a configuration with a reduced flow path sectional area as described below. Alternatively, the shape of the tube wall, the shape of the tube path, or the like may be changed, and any configuration may be utilized as long as the flow resistance is increased. The flow resistance increase portion 400 limits the flow rate of air flowing into the pressure control chamber 141, to thereby prevent abrupt increase in pressure of the pressure control chamber 141. The amount of air per unit time flowing into the pressure control chamber 141 is reduced so that the restoration speed of the elastic member 148 or the change in volume of the second liquid storage chamber 132 per unit time can be reduced. Thus, the change in pressure of the first liquid storage chamber 131 generated by the restoration of the elastic member 148 can be reduced. It is possible to obtain a similar effect by reducing the sectional areas of the first and second flow paths 303a and 303b, but because molding and welding become difficult and the effect of the pump 301 is reduced, it is preferred to arrange the flow resistance increase portion 400.

Figure 19:
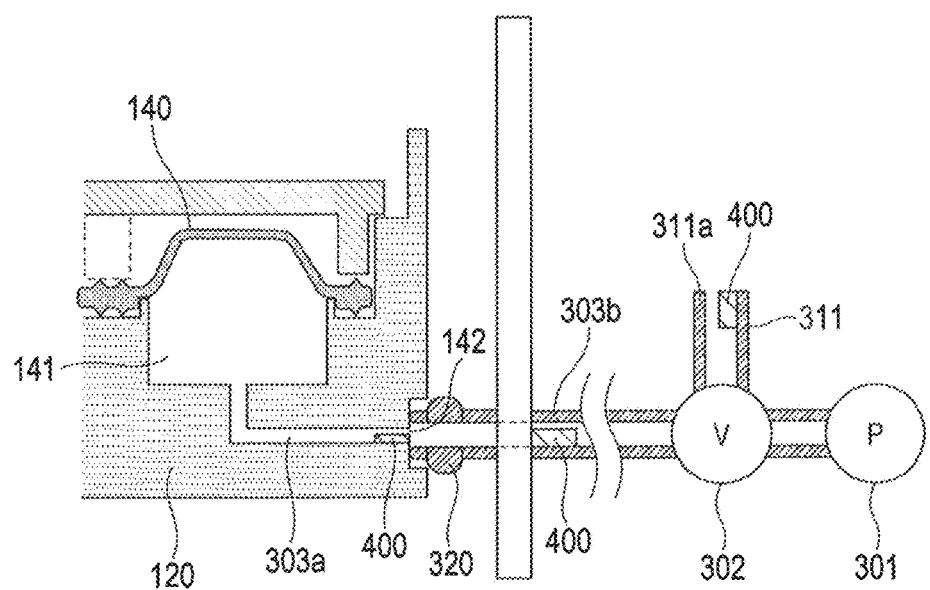
FIG. 19 is a view illustrating an arrangement position of a flow resistance increase portion.

FIG. 19 illustrates the arrangement position of the flow resistance increase portion 400. When the pressure control chamber 141 is opened to the atmosphere by the atmosphere release tube 311 as illustrated in FIGS. 17A to 17C, the flow resistance increase portion 400 may be arranged in the decompression flow path 303 in a range of from the pressure control chamber 141 to the flow path switching portion 302, or on the atmosphere release tube 311. When the pressure control chamber 141 is opened to the atmosphere through the movement of the carriage 200 as illustrated in FIGS. 18A to 18C, the flow resistance increase portion 400 may be arranged in the first flow path 303a. When the flow resistance increase portion 400 is arranged in the first flow path 303a, it is desired to arrange the flow resistance increase portion 400 as close to the connection portion between the first flow path 303a and the second flow path 303b as possible. When the flow resistance increase portion 400 is arranged in the second flow path 303b, it is desired to arrange the flow resistance increase portion 400 as close to the flow path switching portion 302 as possible. When the flow resistance increase portion 400 is arranged on the atmosphere release tube 311, it is desired to arrange the flow resistance increase portion 400 at an atmosphere-release-side end portion 311a. As described above, when the flow resistance increase portion 400 is arranged away from the pressure control chamber 141, the flow path from the flow resistance increase portion 400 to the pressure control chamber 141 is increased in length, and the volume including the pressure control chamber 141 and the flow path is increased. Therefore, the ratio of the air inflow amount to the volume including the pressure control chamber 141 and the flow path is decreased. Thus, the restoration speed of the elastic member 148 can be further reduced, thereby being capable of suppressing the change in pressure of the first liquid storage chamber 131.

In an example, the sectional area of the flow resistance increase portion 400 is 0.008 mm$^2$ to 0.78 mm$^2$, and the length L of the flow resistance increase portion 400 is 5 mm or more. The rubber hardness of the elastic member 148 is 20 degrees to 50 degrees, and the thickness of the elastic member 148 is 0.4 mm to 1.5 mm. The meniscus force generated at the discharge ports 115 of the liquid discharge head 110 is 450 mmAq or more, and the negative pressure of the liquid tank 160 is −35 mmAq or less.

Figure 20A:
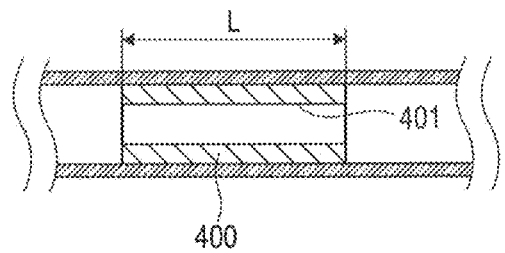
FIGS. 20A, 20AS, 20B, 20BS, 20C, 20CS, 20D, and 20DS are views illustrating various configurations of the flow resistance increase portion.
Figure 20A:
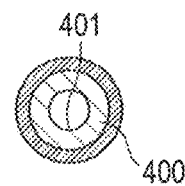
Figure 20B:
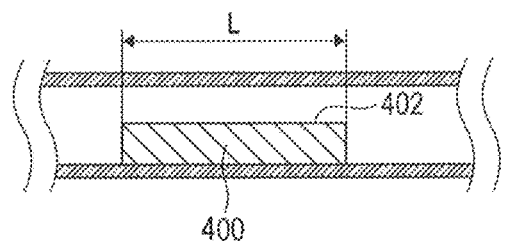
Figure 20B:
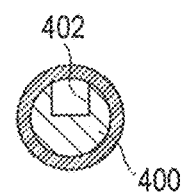
Figure 20C:
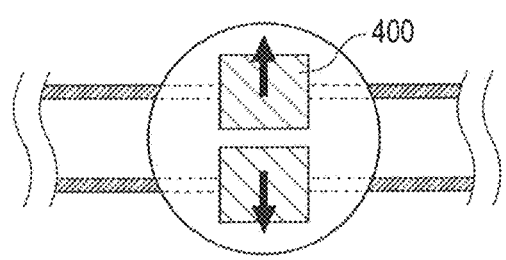
Figure 20C:
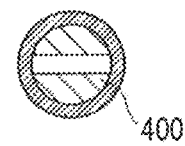
Figure 20D:
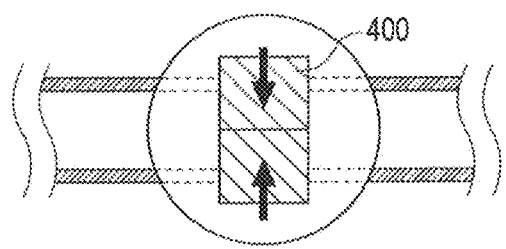
Figure 20D:
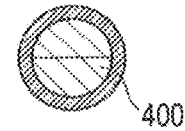

Various embodiments of the flow resistance increase portion 400 are described. Referring to FIGS. 20A and 20AS, the flow resistance increase portion 400 has a through-hole 401. In the illustrated example, the through-hole 401 has a circular shape, but the shape is not limited thereto, and an arbitrary shape such as an elliptical shape or a rectangular shape may be employed. Referring to FIGS. 20B and 20BS, the flow resistance increase portion 400 has a cutout 402 so that a section reduced portion is formed together with the inner surface of the tube path. The configuration has the cutout 402, and hence a metal mold for the flow resistance increase portion 400 is simplified as compared to that in the embodiment of FIGS. 20A and 20AS. Thus, the manufacturing efficiency is enhanced. As illustrated in FIGS. 20C, 20CS, 20D, and 20DS, the flow resistance increase portion 400 in a valve form may also be used. The flow resistance increase portion 400 is opened as illustrated in FIGS. 20C and 20CS, and is closed as illustrated in FIGS. 20D and 20DS. In order to suppress the change in pressure of the first liquid storage chamber 131, the maximum opening area (valve opening degree) or the opening and closing speed (change rate of opening area per unit time) of the flow resistance increase portion 400 (valve) may be controlled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-112182, filed May 30, 2014, which is hereby incorporated by reference herein in its entirety.

What is claimed is:

1. A liquid storage unit, comprising:
a first liquid storage chamber having a constant volume and being capable of holding liquid supplied from a liquid tank;
a second liquid storage chamber communicating with the first liquid storage chamber, the second liquid storage chamber storing the liquid therein;
a pressure control chamber configured to change a pressure of the pressure control chamber through actuation of a pressure control unit;
a liquid flow path member configured to hold a liquid discharge head configured to discharge the liquid, the liquid flow path member comprising a flow path connecting the first liquid storage chamber to the liquid discharge head;
a joint member on which the liquid tank is mounted;
a seal member configured to seal a gap between the liquid flow path member and the joint member; and
an elastic member being configured to tightly partition the second liquid storage chamber and the pressure control chamber from each other and being deformable so as to increase and decrease a volume of the second liquid storage chamber in accordance with the pressure of the pressure control chamber,
wherein the liquid flow path member, the joint member, and the seal member form the first liquid storage chamber, the second liquid storage chamber, and the pressure control chamber,
wherein the elastic member is a part of the seal member,
wherein the elastic member is capable of removing bubbles in the first liquid storage chamber by increasing and decreasing the volume of the second liquid storage chamber through the deformation, and
wherein a wall member of the first liquid storage chamber is thicker than the elastic member, and an area of an inner surface of the first liquid storage chamber is larger than a surface area of the elastic member.

2. A liquid storage unit according to claim 1, further comprising an elastic-member-storing chamber configured to store the elastic member, wherein the elastic-member-storing chamber is partitioned into the second liquid storage chamber and the pressure control chamber by the elastic member.

3. A liquid storage unit according to claim 1,
wherein the seal member comprises:
one first seal portion configured to abut against the joint member and extend continuously so as to surround the first liquid storage chamber, the second liquid storage chamber, and the pressure control chamber; and
two second seal portions configured to abut against the liquid flow path member and respectively extend along a periphery of the first liquid storage chamber and along peripheries of the second liquid storage chamber and the pressure control chamber independently of each other,
wherein the joint member comprises a partition wall configured to partition the first liquid storage chamber and the second liquid storage chamber from each other, and
wherein the partition wall has a cutout connecting the first liquid storage chamber and the second liquid storage chamber to each other.

4. A liquid storage unit according to claim 3, wherein the seal member comprises a projection in a region that is on the side opposite to a region in which one of the one first seal portion and the two second seal portions is arranged and is a region in which the other of the one first seal portion and the two second seal portions is not arranged.

5. A liquid storage unit according to claim 1,
wherein the seal member comprises:
two first seal portions configured to abut against the joint member and respectively extend along a periphery of the first liquid storage chamber and along peripheries of the second liquid storage chamber and the pressure control chamber independently of each other; and
two second seal portions configured to abut against the liquid flow path member and respectively extend along the periphery of the first liquid storage chamber and along the peripheries of the second liquid storage chamber and the pressure control chamber independently of each other,
wherein the joint member comprises a partition wall configured to partition the first liquid storage chamber and the second liquid storage chamber from each other, and
wherein the partition wall has a through-hole connecting the first liquid storage chamber and the second liquid storage chamber to each other.

6. A liquid storage unit according to claim 1, further comprising a liquid supply tube connecting the first liquid storage chamber to the liquid tank, the liquid supply tube being integrated with the first liquid storage chamber.

7. A liquid storage unit according to claim 1, further comprising a liquid supply tube connecting the first liquid storage chamber to the liquid tank, the liquid supply tube having an inlet opening that is formed at an end portion on an opposite side of the first liquid storage chamber and reduces sectional area to form a meniscus.

8. A liquid storage unit according to claim 1, wherein the elastic member comprises:
a flat outer peripheral portion;
a flat inner peripheral portion; and
an intermediate portion connecting the flat outer peripheral portion and the flat inner peripheral portion to each other and being inclined relative to the flat outer peripheral portion and the flat inner peripheral portion.

9. A liquid storage unit according to claim 8,
wherein the intermediate portion is inclined relative to the flat outer peripheral portion at an angle of more than 0 degrees and less than 90 degrees, and
wherein the flat outer peripheral portion is thicker than the flat inner peripheral portion.

10. A liquid storage unit according to claim 6, wherein the elastic member, the second liquid storage chamber, and the pressure control chamber are arranged vertically below the liquid supply tube.

11. A liquid storage unit according to claim 6, wherein the second liquid storage chamber and the pressure control are positioned below an introduction port where the first liquid storage chamber is connected to the liquid supply tube.

12. A liquid storage unit according to claim 1, wherein the elastic member comprises:
   a flexible sheet configured to tightly partition the second liquid storage chamber and the pressure control chamber from each other; and
   a spring being configured to bias the flexible sheet and having one end supported on the flexible sheet and the other end supported on one of the second liquid storage chamber and the pressure control chamber.

13. A liquid storage unit according to claim 1, further comprising a liquid-holding member arranged in the first liquid storage chamber and configured to form a meniscus between the liquid-holding member and a wall surface of first liquid storage chamber, the liquid-holding member having an opening formed at a position opposing to an introduction port of the first liquid storage chamber for the liquid supplied from the liquid tank.

14. A liquid storage unit according to claim 1, wherein the first liquid storage chamber has a lower air permeability per unit area than the elastic member.

15. A liquid storage unit according to claim 1, wherein the liquid tank is removably mountable on the first liquid storage chamber.

16. A liquid discharge apparatus, comprising:
   the liquid storage unit according to claim 1;
   a liquid discharge head; and
   the pressure control unit,
   wherein the pressure control unit comprises:
   a flow path connected to the pressure control chamber;
   a pump positioned on the flow path;
   a flow path switching portion positioned on the flow path and between the pump and the pressure control chamber; and
   an atmosphere release tube branched from the flow path at the flow path switching portion.

17. A method of removing bubbles from a liquid storage unit, the method comprising:
   providing a joint member on which a liquid tank is mountable;
   allowing the liquid tank to communicate with a first liquid storage chamber having a constant volume and communicating with a second liquid storage chamber, the second liquid storage chamber storing the liquid therein;
   providing a liquid flow path member configured to hold a liquid discharge head configured to discharge the liquid, the liquid flow path member comprising a flow path connecting the first liquid storage chamber to the liquid discharge head, wherein a seal member seals a gap between the liquid flow path member and the joint member; and
   increasing and decreasing a volume of the second liquid storage chamber to move bubbles present in the first liquid storage chamber to the liquid tank,
   wherein the volume of the second liquid storage chamber is increased and decreased by changing a pressure of a pressure control chamber that is tightly partitioned from the second liquid storage chamber by an elastic member to thereby deform the elastic member,
   wherein the liquid flow path member, the joint member, and the seal member form the first liquid storage chamber, the second liquid storage chamber, and the pressure control chamber,
   wherein the elastic member is a part of the seal member,
   wherein the bubbles in the first liquid storage chamber are removed by increasing and decreasing the volume of the second liquid storage chamber through deformation of the elastic member, and
   wherein a wall member of the first liquid storage chamber is thicker than the elastic member, and an area of an inner surface of the first liquid storage chamber is larger than a surface area of the elastic member.

18. A liquid storage unit according to claim 1, wherein the elastic member does not have an opening therethrough.

19. A liquid storage unit according to claim 1, wherein the elastic member satisfies both air-tightness and water-tightness.

20. A method according to claim 17, wherein the elastic member does not have an opening therethrough.

21. A method according to claim 17, wherein the elastic member satisfies both air-tightness and water-tightness.

* * * * *